United States Patent
Cao et al.

(10) Patent No.: US 12,277,343 B2
(45) Date of Patent: Apr. 15, 2025

(54) MEMORY CONTROLLER AND CONTROL METHOD THEREOF, MEMORY APPARATUS, AND MEMORY SYSTEM THAT IMPROVE THE BALANCE OF THE READ PERFORMANCE

(71) Applicant: Yangtze Memory Technologies Co., Ltd., Hubei (CN)

(72) Inventors: Na Cao, Hubei (CN); Feifei Zhu, Hubei (CN); Jiaguo Li, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 113 days.

(21) Appl. No.: 18/091,245

(22) Filed: Dec. 29, 2022

(65) Prior Publication Data

US 2024/0168679 A1 May 23, 2024

(30) Foreign Application Priority Data

Nov. 18, 2022 (CN) .......................... 202211449045.8

(51) Int. Cl.
*G06F 3/06* (2006.01)
(52) U.S. Cl.
CPC .......... *G06F 3/0659* (2013.01); *G06F 3/0604* (2013.01); *G06F 3/0656* (2013.01); *G06F 3/0679* (2013.01)
(58) Field of Classification Search
CPC .......... G06F 3/06; G06F 3/0604; G06F 3/061; G06F 3/0656; G06F 3/0659; G06F 3/0679
See application file for complete search history.

(56) References Cited

U.S. PATENT DOCUMENTS

| 2012/0084484 A1* | 4/2012 | Post | G06F 12/0246 710/308 |
| 2016/0134493 A1* | 5/2016 | Susarla | G06F 3/067 709/224 |
| 2020/0034061 A1* | 1/2020 | Khalili | G06F 3/0659 |

* cited by examiner

*Primary Examiner* — Larry T Mackall
(74) *Attorney, Agent, or Firm* — Oblon, McClelland, Maier & Neustadt, L.L.P.

(57) ABSTRACT

Implementations of the present disclosure disclose a memory controller and a control method thereof, a memory apparatus and a control method thereof, and a memory system and a control method thereof. The memory controller is coupled with at least one memory apparatus, and the memory apparatus includes a plurality of pages; the memory controller is configured to: receive a first command set, wherein the first command set includes at least one read command; when the first command set meets a first preset condition, enable a first read mode, wherein the first preset condition includes that the queue depth of the first command set is 1 or the total length of logical addresses in the first command set is less than or equal to a first threshold value; send demands corresponding to the first command set to the memory apparatus; and output data corresponding to the logical addresses in the first command set among all data of a first page sent by the memory apparatus, wherein the first page is a page, which corresponds to the logical addresses in the first command set, in the memory apparatus.

18 Claims, 12 Drawing Sheets

| Case 1: read 1 LBA | A | B | C |
| Case 2: read 4 LBAs (1 page) | A | B | C*4 |
| Case 3: read 16 LBAs (Page Per Die) | A | B | C*16 |

FIG. 6

MEMORY CONTROLLER AND CONTROL METHOD THEREOF, MEMORY APPARATUS, AND MEMORY SYSTEM THAT IMPROVE THE BALANCE OF THE READ PERFORMANCE

INCORPORATION BY REFERENCE

This present application claims the benefit of Chinese Patent Application No. 202211449045.8, filed on Nov. 18, 2022, which is incorporated herein by reference in its entirety.

TECHNICAL FIELD

Implementations of the present disclosure relate to the technical field of memory, and in particular, to a memory controller and a control method thereof, a memory apparatus, and a memory system.

BACKGROUND

In computing devices such as a personal computer, a server or a mobile phone, a memory system may be included for storing user data. The memory system includes a memory apparatus and a memory controller, and the memory apparatus may include flash memory apparatuses such as a NAND. The memory controller may receive a read/write or an erase command from a host (e.g., a central processing unit), so as to control the memory apparatus to execute related operations. In different usage scenarios, the total data size required by the host and the number of times for reading a memory device are different, for example, the number of times for reading is large and the data size is large, or, the number of times for reading is large and the data size is small, and other different cases.

Due to the influence of factors such as bandwidths of the memory controller and a communication input output (IO, Input Output) port of the host or processing frequency of the memory controller, in different usage scenarios, the read performance is unbalanced, and the read performance is relatively low in some usage scenarios. How to improve the read performance of the memory system becomes an urgent problem to be solved.

SUMMARY

According to a first aspect of the implementations of the present disclosure, provided is a memory controller. The memory controller can be coupled with at least one memory apparatus that includes a plurality of pages. The memory controller can be configured to receive a first command set, wherein the first command set includes at least one read command, and, when the first command set meets a first preset condition, enable a first read mode, wherein the first preset condition includes that the queue depth of the first command set is 1 or the total length of logical addresses in the first command set is less than or equal to a first threshold value. The memory controller can be further configured to send demands corresponding to the first command set to the memory apparatus, and output data corresponding to the logical addresses in the first command set among all data of a first page sent by the memory apparatus, wherein the first page is a page, which corresponds to the logical addresses in the first command set, in the memory apparatus.

According to a second aspect of the implementations of the present disclosure, provided is a memory apparatus that can include a memory array and a peripheral circuit. The memory array includes a plurality of pages. The peripheral circuit can be configured to receive a second read command in a first read mode, and perform a read operation on all data of a first page, wherein the first page is a page, which corresponds to logical addresses in a first command set, in the memory apparatus.

According to a third aspect of the implementations of the present disclosure, provided is a memory system that can include a memory controller and at least one memory apparatus coupled with the memory controller. The memory controller is coupled with a host and can be configured to receive a first command set sent by the host, wherein the first command set includes at least one read command, when the first command set meets a first preset condition, enable a first read mode. The first preset condition includes that the queue depth of the first command set is 1 or the total length of logical addresses in the first command set is less than or equal to a first threshold value. The memory controller can further be configured to merge demands corresponding to the first command set into a second read command, and send the second read command to the memory apparatus.

The memory apparatus can include a memory array and a peripheral circuit. The memory array includes a plurality of pages. The peripheral circuit can be configured to receive the second read command in the first read mode, and perform a read operation on a first page, and send all data of the first page to the memory controller, wherein the first page is a page, which corresponds to the logical addresses in the first command set, in the memory apparatus.

The memory controller is further configured to transmit, to the host, data corresponding to the logical addresses in the first command set among all data of the first page that is sent by the memory apparatus.

According to a fourth aspect of the implementations of the present disclosure, provided is a control method of a memory controller. The method can include receiving a first command set, wherein the first command set includes at least one read command, and, when the first command set meets a first preset condition, enabling a first read mode, wherein the first preset condition includes that the queue depth of the first command set is 1 or the total length of logical addresses in the first command set is less than or equal to a first threshold value. The method can further include sending demands corresponding to the first command set to a memory apparatus, and outputting data corresponding to the logical addresses in the first command set among all data of a first page sent by the memory apparatus, wherein the first page is a page, which corresponds to the logical addresses in the first command set, in the memory apparatus.

According to a fifth aspect of the implementations of the present disclosure, provided is a control method of a memory apparatus. The method can include receiving a second read command in a first read mode, and performing a read operation on a first page in the memory apparatus, wherein the first page is a page, which corresponds to logical addresses in a first command set, in the memory apparatus.

According to a sixth aspect of the implementations of the present disclosure, provided is an operation method of a memory system. The method can include receiving, by a memory controller, a first command set sent by a host, wherein the first command set includes at least one read command, and when the first command set meets a first preset condition, enabling a first read mode, wherein the first preset condition includes that the queue depth of the first command set is 1 or the total length of logical addresses in the first command set is less than or equal to a first threshold value. The method can further include merging demands corresponding to the first command set into a second read command, and sending the second read command to a memory apparatus, receiving, by the memory apparatus, the second read command in the first read mode, and performing a read operation on a first page, and sending all data of the first page to the memory controller, wherein the first page is a page, which corresponds to the logical addresses in the first command set, in the memory apparatus, and transmitting, by the memory controller and to the host, data corresponding to the logical addresses in the first command set among all data of the first page sent by the memory apparatus.

After receiving the first command set, the memory controller in the implementations of the present disclosure determines the first command set, and turns on the first read mode only when the first command set meets the first preset condition, such that the first read mode may be started for a case of a low queue depth or a relatively small logical address length included in the first preset condition, so as to fully utilize the parallel read capability of the memory apparatus and to improve the control performance of the memory controller in terms of read.

BRIEF DESCRIPTION OF THE DRAWINGS

Various implementations of this disclosure that are proposed as examples will be described in detail with reference to the following figures, wherein like numerals reference like elements, and wherein:

FIG. 6 is a schematic diagram illustrating a time required by each node in a memory system in different read cases according to a implementation of the present disclosure;

DETAILED DESCRIPTION

The technical solutions of the present disclosure will be further described in detail below in combination with the drawings and specific implementations.

In the implementations of the present disclosure, the terms "first", "second" and the like are used to distinguish similar objects, and are not used to describe a specific order or a precedence order.

In the implementations of the present disclosure, the term "A is in contact with B" includes a case where A is in direct contact with B, or a case where other components are inserted between A and B, and A is in indirect contact with B. The term "A is coupled with B" include a case where A is directly coupled with B, or a case where other components are inserted between A and B, and A is indirectly coupled with B.

It should be noted that, although the present specification is described according to implementations, not each implementation only includes an independent technical solution, the narration mode of the specification is merely for the sake of clarity, those skilled in the art should use the specification as a whole, and the technical solutions in the implementations may also be appropriately combined to form other implementations that may be understood by those skilled in the art.

It should be noted that, a command set in the present disclosure may also be referred to as a command collection.

Figure 1:
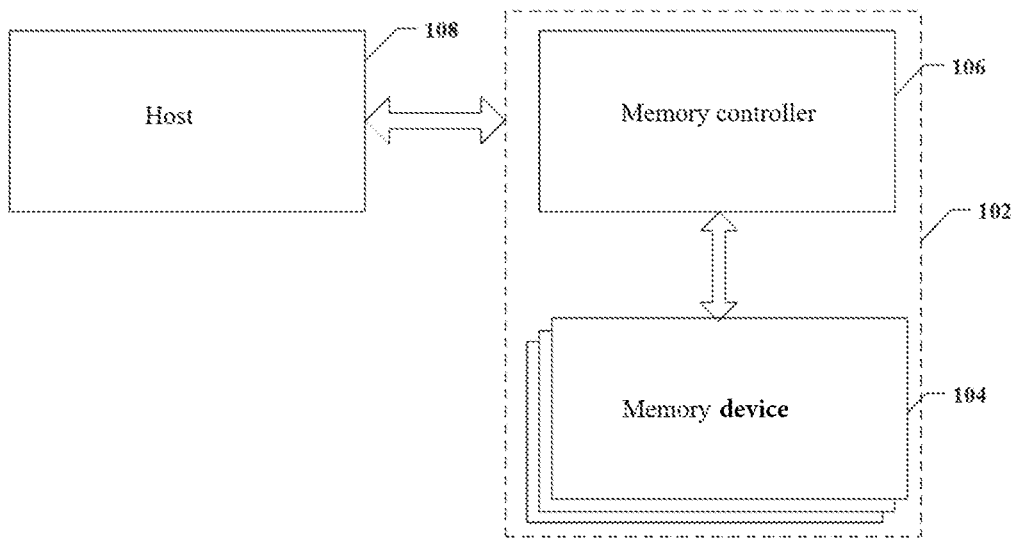
FIG. 1 is a block diagram illustrating a system having a memory controller according to an implementation of the present disclosure.

FIG. 1 illustrates a block diagram of a system 100 having a memory apparatus in some aspects of the implementations of the present disclosure. The system 100 may be a mobile phone, a desktop computer, a laptop computer, a tablet computer, a vehicle computer, a game console, a printer, a positioning device, a wearable electronic device, a smart sensor, a virtual reality (VR) device, an augmented reality (AR) device, or any other suitable electronic devices having memories therein. As shown in FIG. 1, the system 100 may include a host 108 and a memory system 102, and the memory system 102 has one or more memory apparatuses 104 and a memory controller 106. The host 108 may be a processor (e.g., a central processing unit (CPU)) or a system on chip (SoC) (e.g., an application processor (AP)) of the electronic device. The host 108 may be configured to send data to the memory device 104 or receive data from the memory device 104.

The memory device 104 may be any memory disclosed in the present disclosure. As disclosed in detail below, the memory device 104 (e.g., a NAND flash memory (e.g., a three-dimensional (3D) NAND flash memory)) may have reduced leakage current from a drive transistor (e.g., a string driver) coupled with an unselected word line during an erase operation, which allows a further reduction in the size of the drive transistor.

According to some implementations, the memory controller 106 is coupled with the memory device 104 and the host 108, and is configured to control the memory device 104. The memory controller 106 may manage data stored in the memory device 104 and communicate with the host 108.

In some implementations, the memory controller 106 is designed to operate in a low duty cycle environment, such as a secure digital (SD) card, a compact flash (CF) card, a universal serial bus (USB) flash driver, or other media for use in electronic devices such as personal calculators, digital cameras and mobile phones. In some implementations, the memory controller 106 is designed to operate in a high duty cycle environment SSD or an embedded multimedia card (eMMC), the SSD or eMMC serves as a data memory and an enterprise memory array of mobile devices such as smartphones, tablet computers and laptop computers. The memory controller 106 may be configured to control operations of the memory device 104, such as reading, erasing and programming operations. The memory controller 106 may also be configured to manage various functions regarding data that is stored in or to be stored in the memory device 104, including, but not limited to, bad block management, garbage collection, logical address to physical address transformation, loss equalization, etc.

In some implementations, the memory controller 106 is further configured to process an error correction code (ECC) with respect to data that is read from the memory device 104 or written into the memory device 104. The memory controller 106 may also execute any other suitable functions, such as formatting the memory device 104. The memory controller 106 may communicate with an external device (e.g., the host 108) according to a particular communication protocol. For example, the memory controller 106 may communicate with the external device through at least one of various interface protocols, such as a USB protocol, an MMC protocol, a periphery component interconnect (PCI) protocol, a PCI express (PCI-E) protocol, an advanced technology attachment (ATA) protocol, a serial ATA protocol, a parallel ATA protocol, a small computer small interface (SCSI) protocol, an enhanced small disk interface (ESDI) protocol, an integrated drive electronics (IDE) protocol, a Firewire protocol, etc.

Figure 2A:
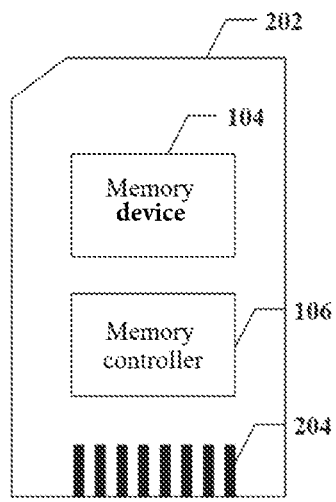
FIG. 2a is a schematic diagram illustrating a memory card having a memory controller according to an implementation of the present disclosure.
Figure 2B:
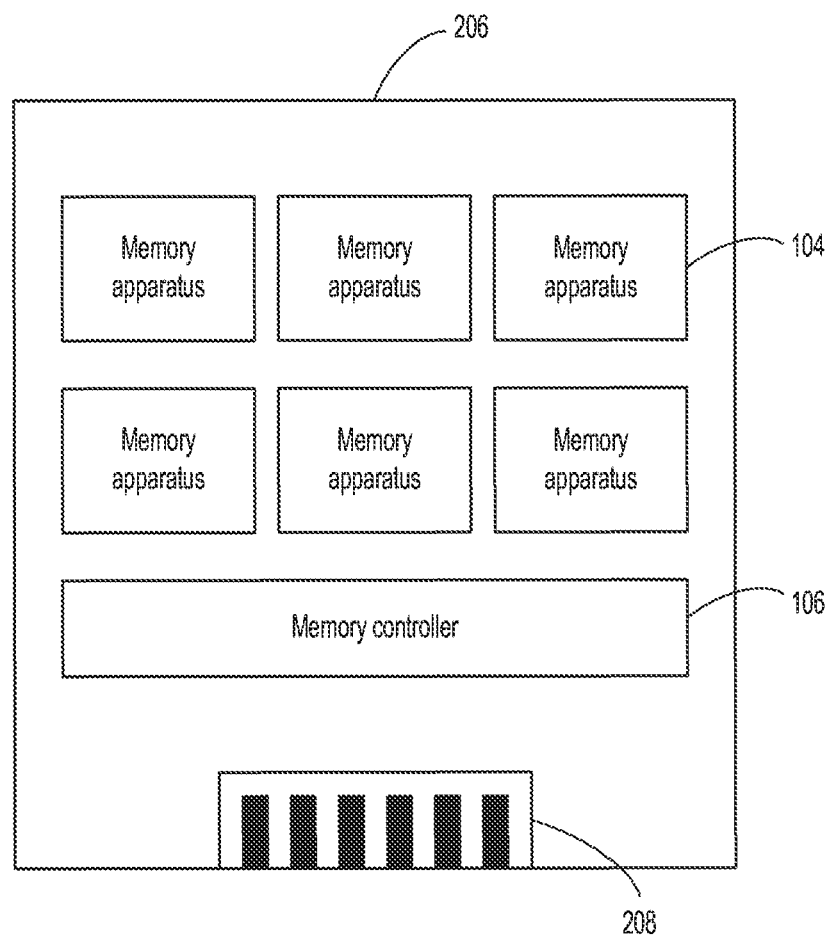
FIG. 2b is a schematic diagram illustrating a solid-state driver having a memory controller according to an implementation of the present disclosure.

The memory controller 106 and one or more memory apparatuses 104 may be integrated into various types of memory devices, for example, being included in the same package (e.g., a universal flash memory (UFS) package or an eMMC package). That is to say, the memory system 102 may be implemented and packaged into different types of terminal electronic products. In one example as shown in FIG. 2a, the memory controller 106 and a single memory device 104 may be integrated into a memory card 202. The memory card 202 may include a PC card (PCMCIA, Personal Computer Memory Card International Association), a CF card, a smart media (SM) card, a memory stick, a multimedia card (MMC, RS-MMC, MMCmicro), an SD card (SD, miniSD, microSD, SDHC), a UFS, etc. The memory card 202 may also include a memory card connector 204 for coupling the memory card 202 to a host (e.g., the host 108 in FIG. 1). In another example as shown in FIG. 2b, the memory controller 106 and a plurality of memory apparatuses 104 may be integrated into an SSD 206. The SSD 206 may also include an SSD connector 208 for coupling the SSD 206 to a host (e.g., the host 108 in FIG. 1). In some implementations, the memory capacity and/or operating speed of the SSD 206 is greater than the memory capacity and/or operating speed of the memory card 202.

In some implementations, the memory apparatus may include a memory array and a peripheral circuit, the memory array and the peripheral circuit may be disposed on the same wafer, that is, the memory array and the peripheral circuit are disposed on the same die (Die) to form a chip (chip), and the memory array and the peripheral circuit may be respectively disposed on different wafers, that is, the memory array Die and the peripheral circuit Die are mixed and bonded to form a chip (chip). The Die mentioned in the implementations of the present disclosure uses the memory array as a division object, and one Die may or may not include the peripheral circuit, and the memory array may include a plurality of Dies. One Die of the memory array has at least one memory plane (plane), and adjacent planes may be divided by a cutting lane, each plane may include a plurality of pages (page), memory cells on each page share a word line, and each page may be used as a minimum unit of read and write operations. Each plane may be divided into a plurality of memory blocks (block), and each block may be used as a minimum unit of an erase operation. One memory apparatus may include one or more Dies.

Figure 3:
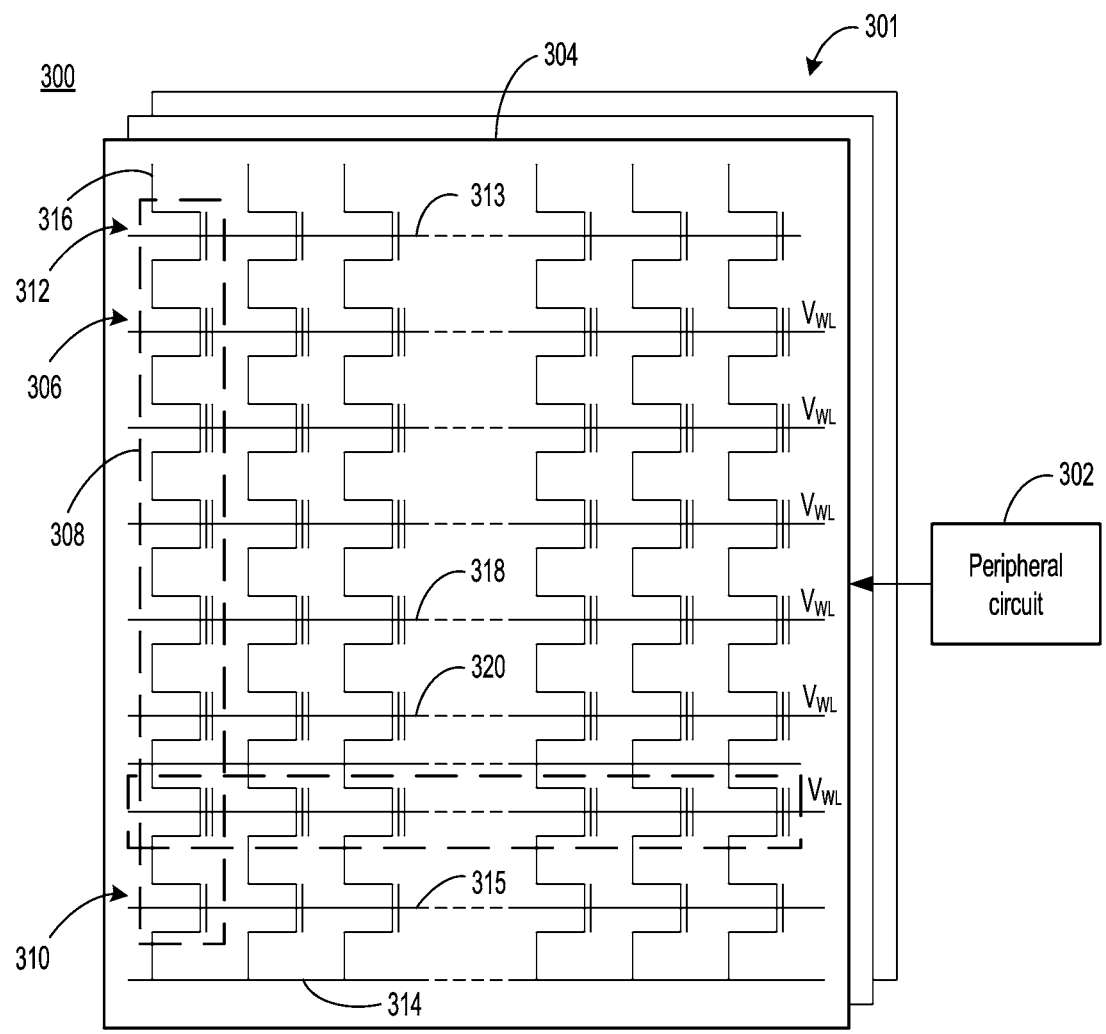
FIG. 3 is a schematic diagram illustrating a memory apparatus including a peripheral circuit according to an implementation of the present disclosure.

FIG. 3 illustrates a schematic circuit diagram of memory apparatus 300 including a peripheral circuit in some aspects of the implementations of the present disclosure. The memory apparatus 300 may be an example of the memory device 104 in FIG. 1. The memory 300 may include a memory array 301 and a peripheral circuit 302 coupled with the memory array 301. The memory array 301 may be a NAND flash memory array, wherein memory cells 306 are provided in the form of an array of NAND memory strings 308, and each NAND memory string 308 extends vertically above a substrate (not shown).

In some implementations, each NAND memory string 308 includes a plurality of memory cells 306 that are coupled in series and stacked vertically. Each memory cell 306 may maintain a continuous analog value, such as a voltage or charge, depending on the number of electrons trapped within the area of the memory cell 306. Each memory cell 306 may be a floating gate type memory cell including a floating gate transistor, or a charge trap type memory cell including a charge trap transistor.

In some implementations, each memory cell 306 is a single-level cell (SLC) that has two possible memory states and thus may store one bit of data. For example, a first memory state "0" may correspond to a first voltage range, and a second memory state "1" may correspond to a second voltage range. In some implementations, each memory cell 306 is a multi-level cell (MLC) that is capable of storing more than a single bit of data in more than four memory states. For example, the MLC may store two bits per cell, each cell stores three bits (also referred to as a tertiary-level cell (TLC)), or each cell stores four bits (also referred to as a quad-level cell (QLC)). Each MLC may be programmed to take the range of possible nominal memory values. In one example, if each MLC stores two bits of data, the MLC may be programmed to write one of three possible nominal memory values into the cell, and a fourth nominal memory value other than the three nominal memory values may be used to represent an erase state.

As shown in FIG. 3, each NAND memory string 308 may include a source selection gate (SSG) 310 at its source end and a drain selection gate (DSG) 312 at its drain end. The SSG 310 and the DSG 312 may be configured to activate selected NAND memory strings 308 (a column of the array) during reading and programming operations. In some implementations, the sources of the NAND memory strings 308 in the same block 304 are coupled by the same source line (SL) 314 (e.g., a common SL).

According to some implementations, all NAND memory strings 308 in the same block 304 have an array common source (ACS). According to some implementations, the DSG 312 of each NAND memory string 308 is coupled with a respective bit line 316, and data may be read from or written into the bit line 316 via an output bus (not shown). In some implementations, each NAND memory string 308 is configured to be selected or deselected by applying a select voltage (e.g., higher than a threshold voltage of a transistor with the DSG 312) or a deselect voltage (e.g., 0 V) to the corresponding DSG 312 via one or more DSG lines 313 and/or by applying a select voltage (e.g., higher than the threshold voltage of a transistor with the SSG 310) or a deselect voltage (e.g., 0 V) to the corresponding SSG 310 via one or more SSG lines 315.

As shown in FIG. 3, the NAND memory strings 308 may be organized into a plurality of blocks 304, each of the plurality of blocks 304 may have a common source line 314 (e.g., coupled with ground). In some implementations, each block 304 is a basic data unit for an erase operation, that is, all memory cells 306 on the same block 304 are erased simultaneously. To erase the memory cells 306 in a selected block 304a, an erase voltage (Vers) (e.g., a high positive voltage (e.g., 20 V or higher)) may be used to bias source lines 314, which are coupled with the selected block 304a and unselected blocks 304b on the same plane as the selected block.

It should be understood that, in some examples, an erase operation may be performed at a half-block level, at a quarter-block level, or at a level having any suitable number of blocks or any suitable fraction of the blocks. The memory cells 306 of adjacent NAND memory strings 308 may be coupled by word lines 318, and the word lines 318 select which row of the memory cells 306 is affected by the reading and programming operations. In some implementations, each word line 318 is coupled with a page 320 of the memory cell 306, and the page 320 is a basic data unit for the programming operation. The size of one page 320 in bits may be related to the number of NAND memory strings 308, which are coupled by the word lines 318, in one block 304. Each word line 318 may include a plurality of control gates (gate electrodes) at each memory cell 306 in the corresponding page 320, and a gate line for coupling the control gates. The page 320 illustrated in FIG. 3 may include a row of memory cells 306, and may also include multiple rows of memory cells 306, which share one word line voltage and are on the same layer.

Figure 4:
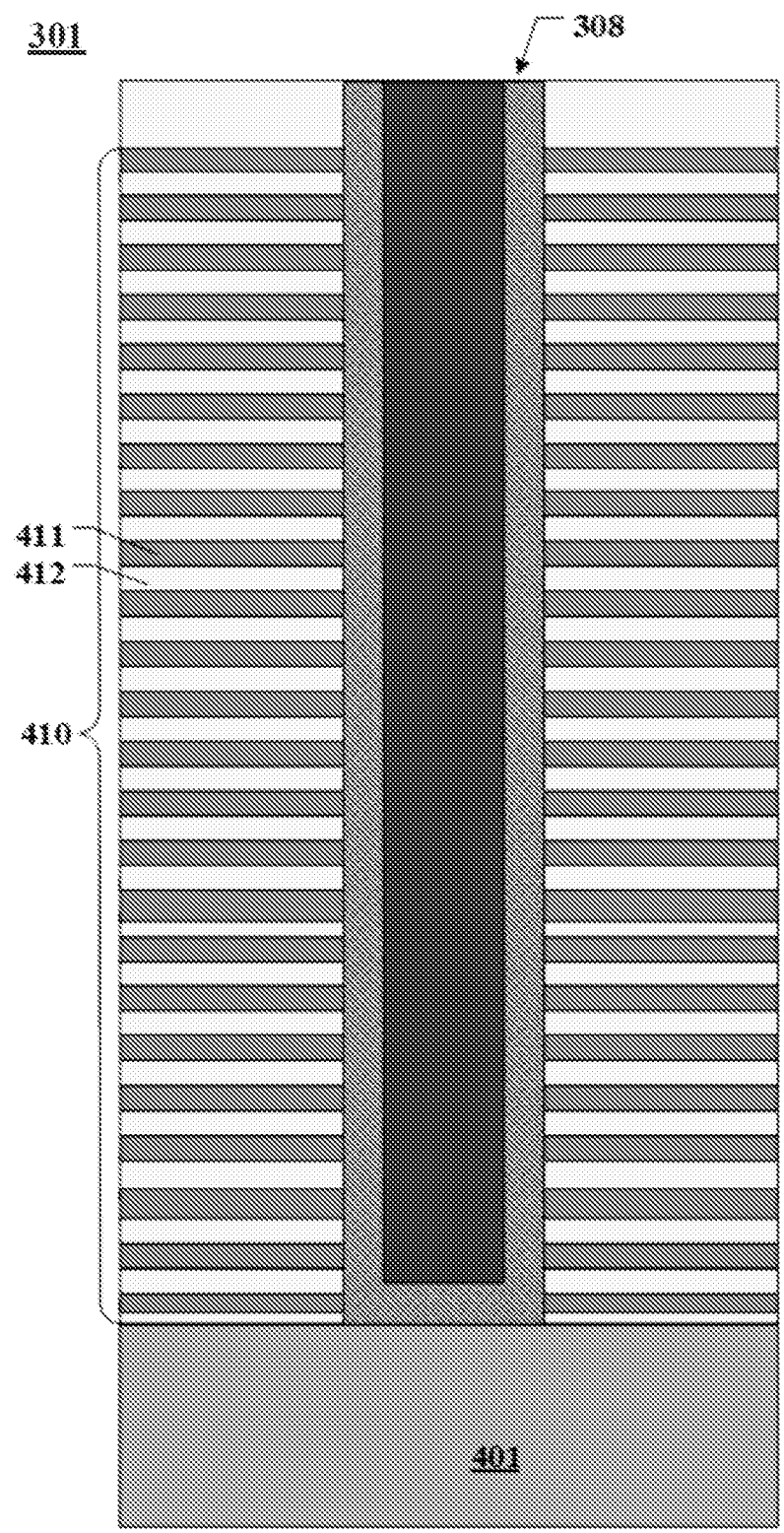
FIG. 4 is a schematic diagram illustrating a NAND memory string according to an implementation of the present disclosure.

FIG. 4 illustrates a side view of a cross section of an example memory array 301 including a NAND memory string 308 in some aspects of the implementations of the present disclosure. As shown in FIG. 4, the NAND memory string 308 may include a stacked structure 410, and the stacked structure 410 includes a plurality of gate layers 411 and a plurality of insulating layers 412, which are alternately stacked in sequence, and a memory string 308 vertically penetrating through the gate layers 411 and the insulating layers 412. The gate layers 411 and the insulating layers 412 may be alternately stacked, and two adjacent gate layers 411 are spaced apart by one insulating layer 412. The number of pairs of the gate layers 411 and the insulating layers 412 in the stacked structure 410 may be used to determine the number of memory cells included in a memory array 401.

The constituent material of the gate layer 411 may include a conductive material. The conductive material includes, but is not limited to, tungsten (W), cobalt (Co), copper (Cu), aluminum (Al), polysilicon, doped silicon, silicide, or any combination thereof. In some implementations, each gate layer 411 includes a metal layer, for example, a tungsten layer. In some implementations, each gate layer 411 includes a doped polysilicon layer. Each gate layer 411 may include a control gate surrounding the memory cell. The gate layer 411 at the top of the stacked structure 410 may extend laterally to serve as an upper selection gate line, the gate layer 411 at the bottom of the stacked structure 410 may extend laterally to serve as a lower selection gate line, and the gate layer 411 extending laterally between the upper selection gate line and the lower selection gate line may serve as a word line layer.

In some implementations, the stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other suitable materials.

In some implementations, the NAND memory string 308 includes a channel structure extending vertically through stacked structure 410. In some implementations, the channel structure includes a channel hole filled with (one or more) semiconductor materials (e.g., as semiconductor channels) and (one or more) dielectric materials (e.g., as memory films). In some implementations, the semiconductor channel includes silicon, for example, polysilicon. In some implementations, the memory film is a composite dielectric layer that includes a tunneling layer, a memory layer (also referred to as a "charge trap/memory layer") and a blocking layer. The channel structure may have a cylindrical shape (e.g., a column shape). According to some implementations, the semiconductor channel, the tunneling layer, the memory layer and the blocking layer are disposed radially from the center of the column toward the outer surface of the column. The tunneling layer may include silicon oxide, silicon oxynitride, or any combination thereof. The memory layer may include silicon nitride, silicon oxynitride, or any combination thereof. The blocking layer may include silicon oxide, silicon oxynitride, a dielectric with a high dielectric constant (high k), or any combination thereof. In one example, the memory film may include a composite layer of silicon oxide/silicon oxynitride/silicon oxide (ONO).

Figure 5:
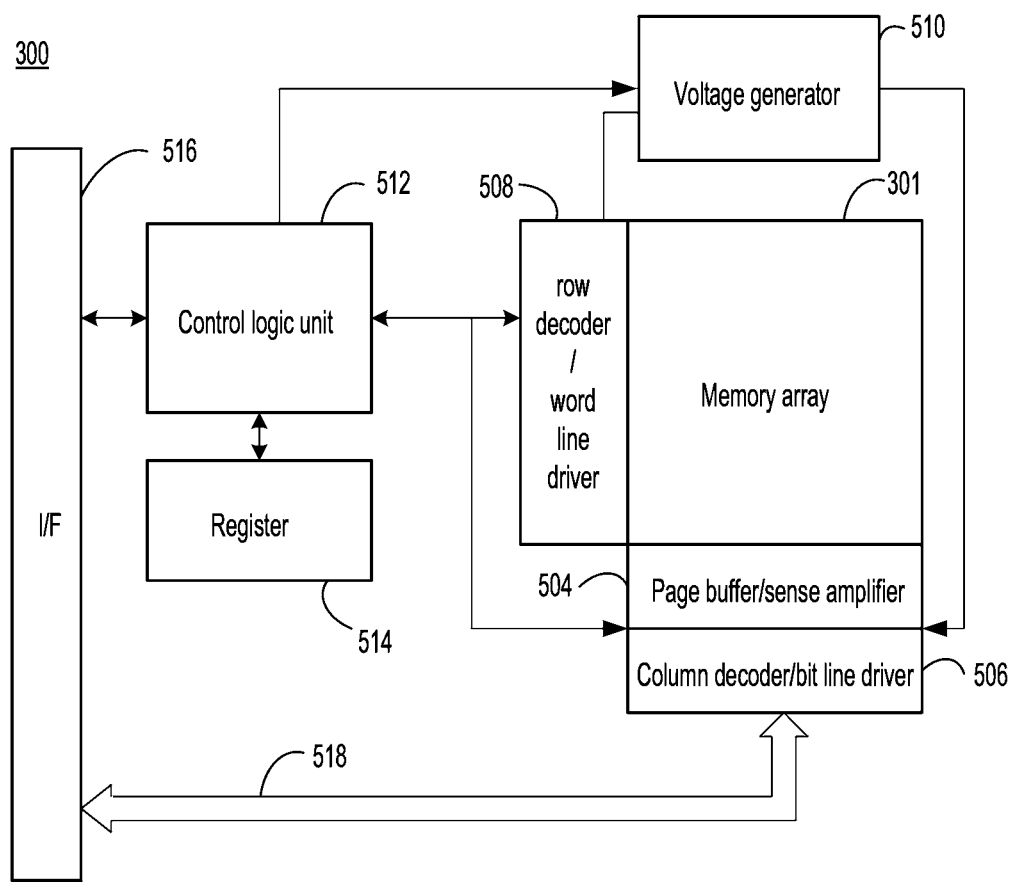
FIG. 5 is a schematic diagram illustrating a memory apparatus including a memory array and a peripheral circuit according to an implementation of the present disclosure.

Referring back to FIG. 3, the peripheral circuit 302 may be coupled with the memory array 301 via the bit line 316, the word line 318, the source line 314, the SSG line 315 and the DSG line 313. The peripheral circuit 302 may include any suitable analog, digital and hybrid signal circuits, so as to promote an operation of the memory array 301 by means of applying a voltage signal and/or a current signal to each target memory cell 306 and sensing the voltage signal and/or the current signal from each target memory cell 306 via the bit line 316, the word line 318, the source line 314, the SSG line 315 and the DSG line 313. The peripheral circuit 302 may include various types of peripheral circuits formed by using the metal-oxide-semiconductor (MOS) technology. For example, FIG. 5 illustrates some peripheral circuits, the peripheral circuit 302 includes a page buffer/sense amplifier 504, a column decoder/bit line driver 506, a row decoder/word line driver 508, a voltage generator 510, a control logic unit 512, a register 514, an interface 516 and a data bus 518. It should be understood that, in some examples, additional peripheral circuits not shown in FIG. 5 may also be included.

The page buffer/sense amplifier 504 may be configured to read data from the memory array 301 and program (write) data into the memory array 301 according to a control signal from the control logic unit 512. In one example, the page buffer/sense amplifier 504 may store a page of programming data (write data) to be programmed into one page 320 of the memory array 301. In another example, the page buffer/sense amplifier 504 may execute a programming verification operation, so as to ensure that data has been correctly programmed into the memory cell 306, which is coupled with the selected word line 318. In yet another example, the page buffer/sense amplifier 504 may also sense a low-power signal that is from the bit line 316 and represents a data bit stored in the memory cell 306, and amplify a small voltage swing to an identifiable logic level in a read operation. The column decoder/bit line driver 506 may be configured to be controlled by the control logic unit 512, and select one or more NAND memory strings 308 by applying a bit line voltage generated from the voltage generator 510.

The row decoder/word line driver 508 may be configured to be controlled by the control logic unit 512, and select/deselect the block 304 of the memory array 301 and select/deselect the word line 318 of the block 304. The row decoder/word line driver 508 may also be configured to drive the word line 318 by using a word line voltage generated from the voltage generator 510. In some implementations, the row decoder/word line driver 508 may also select/deselect, and drive the SSG line 315 and the DSD line 313. As described in detail below, the row decoder/word line driver 508 is configured to execute an erase operation on the memory cell 306 coupled with (one or more) selected word lines 318. The voltage generator 510 may be configured to be controlled by the control logic unit 512, and generate the word line voltage (e.g., a read voltage, a programming voltage, a pass voltage, a local voltage, a verification voltage, etc.), the bit line voltage and a source line voltage to be supplied to the memory array 301.

The control logic unit 512 may be coupled with each peripheral circuit described above and be configured to control the operation of each peripheral circuit. The register 514 may be coupled with the control logic unit 512, and include a state register, a command register and an address register, so as to store state information, a command operation code (OP code) and a command address for controlling the operation of each peripheral circuit. The interface 516 may be coupled with the control logic unit 512 and serve as a control buffer, so as to buffer a control command received from a host (not shown) and relay the same to the control logic unit 512, and to buffer state information received from the control logic unit 512 and relay the same to the host. The interface 516 may also be coupled with the column decoder/bit line driver 506 via the data bus 518, and serve as a data I/O interface and a data buffer, so as to buffer and relay the data to the memory array 301 or relay or buffer the data from the memory array 301.

In some implementations, when the host acquires data from the memory apparatus, the host may first send, to the memory controller, a logical address (LBA) of the data that needs to be acquired, the memory controller queries and acquires a physical address (or a physical location) of the data stored in the memory apparatus by means of a logical address (LBA)-physical address (PCA) mapping table, the memory controller then sends a read command to the memory apparatus, and the memory apparatus receives the read command and reads a memory area corresponding to the physical address. In some specific examples, the host may send a command to the memory controller, so as to acquire data; and the host may also send a command set containing a plurality of commands to the memory controller, so as to acquire data. After receiving the command set containing the plurality of commands, the memory controller may control the memory apparatus to read the data for a command, until corresponding data in the command set is completely read; or, the memory controller may send a data read request in the command set to the memory apparatus at one time, and the memory apparatus may perform parallel read on different memory areas according to the physical address of data memory. Here, the host may be sent to the command set of the memory controller at one time, the command set includes N commands (e.g., read commands or writing commands), and all commands in the command set need to be currently processed by the memory at one time, N may also be referred to as a queue depth (QD), and N is a positive integer. The value range of N may be determined according to different bandwidths of different communication protocols between the host and the memory apparatus, for example, the queue depth in an UFS protocol may include 1 to 32, which is not limited in the implementations of the present disclosure. In an actual use process of the memory system, different usage scenarios of the host require different data sizes, the priorities of the required data are different, and the N value may dynamically change, which may be determined by the host.

When the queue depth is 1, the memory controller completes the next command operation after completing one command. When the queue depth is greater than 1, for example, 32, if the memory controller processes the 32 commands one by one, the data read by the memory apparatus needs to be sent to the memory controller for 32 times. In some implementations of the implementations of the present disclosure, the memory controller may merge the logical addresses of some or all commands, physical addresses corresponding to the merged logical addresses may exist in the same page, or pages in the same row on all planes in one Die, and on the basis of the parallel read characteristics of a NAND memory, the time required by the NAND memory for reading a certain segment of physical address therein and the entire page or the entire row may be the same. It can be understood that, more physical addresses corresponding to the merged logical addresses may exist in the same page or in the pages in the same row of all planes in one Die, then the more the data read in parallel by the NAND memory is, the higher the read performance is.

Therefore, in some specific implementations, the memory controller may be configured to read one page or pages on the same row of all planes in one Die, so as to shorten the read time.

FIG. 6 shows the time required by each node in the memory system in three different read cases. For example, in case 1, one logical address is read, and the length of the logical address may be denoted as Len. In case 2, four logical addresses are read, the length of the logical addresses is four times the length of case 1, and entire-page read is performed on one page. In case 3, 16 logical addresses are read, the length of the logical addresses is 16 times that of case 1, and the pages on the same row of all planes in one Die are read. In the three read cases, the time required by the host for sending a read command to the memory controller and the time required by the memory controller for processing the read command is the same and is denoted as A, and the time required by the memory apparatus for reading the data is the same and is denoted as B, wherein the time when the data is returned to the host is different, and is C in case 1; the case 2 is 4 times that of the case 1, that is, C*4; and the case 3 is 16 times that of the case 1, that is, C*16. The logical address in case 1 herein may be located on one page of one plane; or, some logical addresses in case 1 are located on one page of one plane, and the other parts are located on the pages of the same row of one (or more) plane (s).

In some examples, when the host needs to perform sequential read on the memory system, the logical addresses are continuous, and the physical addresses are continuous; compared with random read in which the logical addresses are discontinuous, more or even all logical addresses in cases 1-3 may be located on one page of one plane or on the pages of the same row of all planes in one Die, so that the data of the pages in the same row of all planes in one Die may be directly read, thereby shortening the read time of the memory apparatus. With continued reference to FIG. 6, although in the sequential read process, the parallel read capability of the NAND memory apparatus is exerted in the sequential read process of different queue depths and different logical address lengths, so as to shorten the time of the memory apparatus for reading the node, due to the limitation of the computing frequency of the memory controller and the bandwidth of the protocol interface, when the read logical address is relatively long, the time for transmitting the data back to the host through the memory controller or directly transmitting the data back to the host may be prolonged.

In this regard, an implementation of the present disclosure provides an operation method of a memory system, so as to improve the sequential read efficiency of the memory system, and the operation method includes the following steps:

Step 1: a memory controller receives a first read command set sent by a host, wherein the first read command set includes at least one read command, and logical addresses in the first read command set are continuous; the memory controller merges the logical addresses in the first read command set, queries a logical address-physical address mapping table, merges physical addresses having the same Die and in pages of the same row, and sends the read command to a memory apparatus;

Step 2: the memory apparatus receives the read command, and reads data from an entire page (page) in one Die, until the read of the logical addresses in the first read command set is completed; the memory apparatus sends the read data to the memory controller;

Step 3: the memory controller stores the data sent by the memory apparatus in a read buffer area of the memory controller; and Step 4: the memory controller transmits, to a host, data corresponding the logical addresses in the first read command set among the data stored in the read buffer area.

Figure 7:
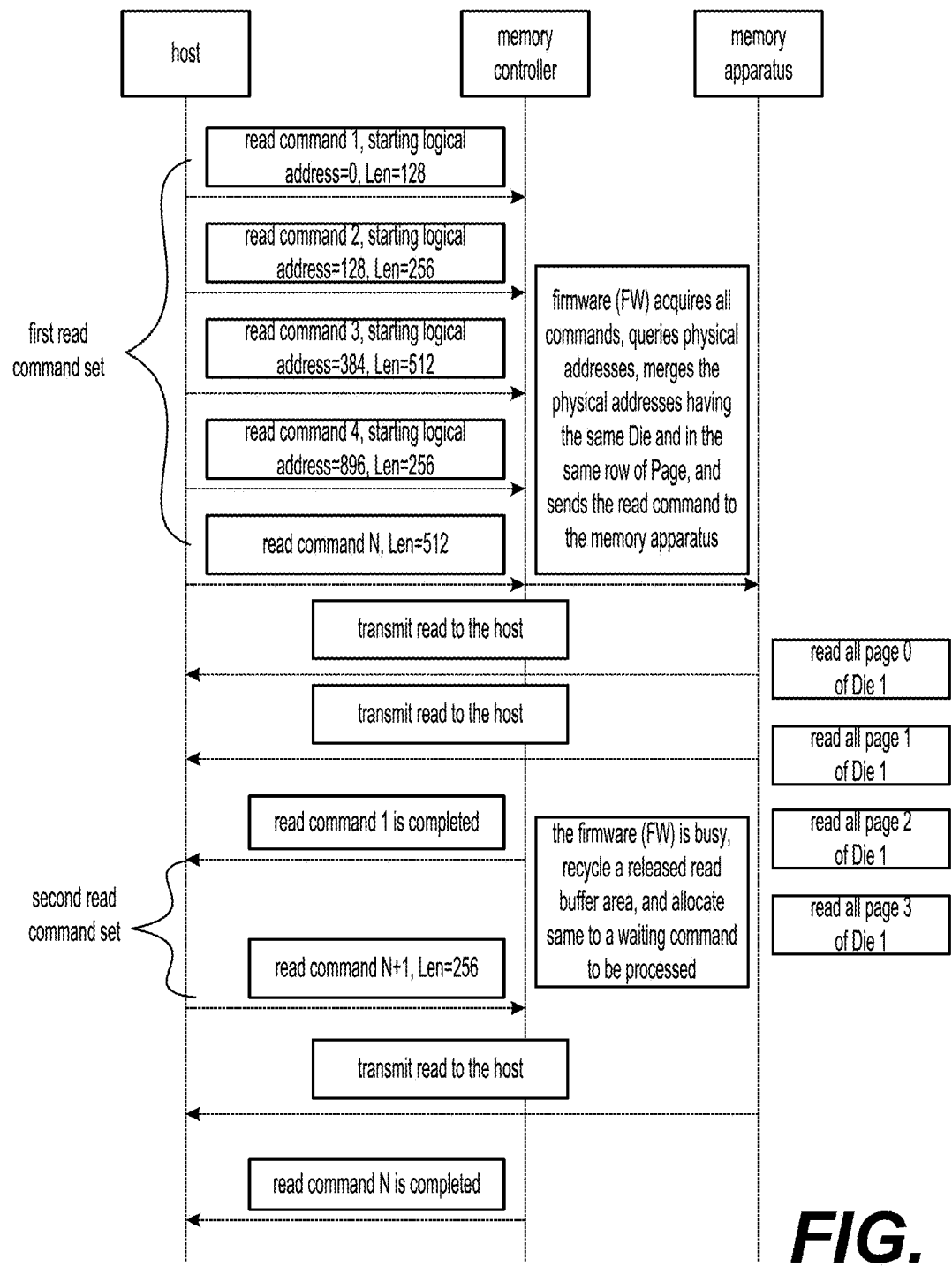
FIG. 7 is a schematic diagram illustrating a memory controller for controlling read according to an implementation of the present disclosure.

Specifically, referring to FIG. 7, the first read command set in the present implementation may include N read commands, the N read commands need to be processed at one time by the memory controller of the host in a certain specific application scenario, that is, the queue depth of the first read command set is N, and N may dynamically change, and may be a positive integer from 1 to 32. The logical addresses of the first read command set are continuous, wherein the logical addresses of any one of the read commands are also continuous; for example, the starting logical address of a read command 1 is 0, the logical address length Len is 128, and the logical addresses thereof are 0 to 127; and similarly, the logical addresses of a read command 2 are 128 to 383, the logical addresses of a read command 3 are 384 to 895, and the logical addresses of a read command 4 are 896 to 1151. The logical addresses of a read command N and a previous read command N−1 are also continuous, which will not be repeated herein. After the first command set ends, the host may send a second read command set to the memory controller, for example, a read command N+1 as shown in FIG. 7, at this time, the queue depth of the second read command set is 1, and the logical address thereof is continuous with that of the last read command N in the first read command set. The second read command set shown in FIG. 7 may include more read commands, and thus having a greater queue depth.

The firmware of the memory controller may acquire all logical addresses in the first command set, merge these logical addresses, query physical addresses, and perform entire-page read on all pages of the Die where the physical addresses are located until the read is completed. The pages herein may include all pages of the same row in a plurality of planes in the Die, and each page may include a single row or multiple rows of memory cells.

In some examples, the first command set in FIG. 7 may only include the first four read commands, the logical addresses after the merging of the logical addresses of the read commands 1 to 4 are 0 to 1151, the firmware (FW) of the memory controller discovers, after querying the physical addresses, that the logical addresses 0 to 1151 are distributed in page 0 to page 2 of Die 1, the logical addresses of a single command may form cross-page distribution, for example, a part of logical addresses of the read command 3 is in page 0, and the other part of addresses is in page 1, which is not limited in the implementations of the present disclosure. The memory controller sends, to the memory apparatus, all data that needs to be read from page 0 to page 1 of Die 1 into the read buffer area. When the first read command set includes more read commands, for example, N read commands, page 3 or more pages of Die 1, and even the pages of Die 2 may also be read.

The memory controller may store the data read by the memory apparatus in the read buffer area, and then send the data required by the host from the read buffer area to the host according to the logical addresses of the first read command set. The read buffer area may store the data read by the memory apparatus, may also store information of the first read command set sent by the host, and may also provide a buffer memory space for the operation of the firmware of the memory controller.

In the implementations of the present disclosure, the bandwidth between the read buffer area and the host is greater than the bandwidth between the memory apparatus and the host, and the memory controller sends data from the read buffer area to the host, so as to improve the read rate. In the implementations of the present disclosure, if the capacity of the read buffer area is large enough, the read command information sent by the host and the read data returned by the memory apparatus may be accommodated, and the memory controller does not have to wait until the data is returned to the host to release the space of the read buffer area for the next read, so that the waiting time of data queuing can be shortened, and the performance is improved.

In some implementations, with regard to the sequential read shown in FIG. 7, if the queue depth of the first read command set is small (there are few commands), but the logical address length Len of a single read command is large enough, the memory controller may merge the logical addresses, or perform simultaneous and parallel read on a single read command, the read performance of the entire memory system is limited by the parallel read capability of entire-page read of the memory apparatus and the size of the read buffer area, the higher the parallel read capability of the memory apparatus is, the greater the read buffer area of the memory controller is, and the higher the read performance is.

In some implementations, with regard to the sequential read shown in FIG. 7, if the logical address length Len of a single read command of the first read command set is small, but the queue depth is large (there are a lot of commands), the memory controller may merge the logical addresses, and control the memory to read the merged logical addresses, at this time, the read performance is limited by the size of the read buffer area of the memory controller, and the greater the read buffer area is, the higher the read performance is.

In some other implementations, if the logical address length Len of a single read command of the first read command set is small, the queue depth is also small, the read buffer area or the firmware of the memory controller may be idle, such that the parallel read performance of the memory apparatus and the read buffer area cannot be fully utilized. For example, as shown in FIG. 8, the queue depth of the first read command set is 3, including read commands 1 to 3; the logical address of the read command 1 is 0, the logical addresses of the read command 2 are 1 to 4, the logical addresses of the read command 3 are 5 to 20, the memory controller merges the acquired logical addresses of the three commands, the merged logical addresses are 0 to 20, the logical address length is relatively small, the data size is relatively small as well, and the memory only needs to read the data of the physical addresses 0 to 20 in page 0 of Die 1, such that the firmware and the read buffer area of the memory controller may be idle, the parallel read performance of the memory apparatus cannot be exerted, and part of memory area of which is idle.

Figure 8:
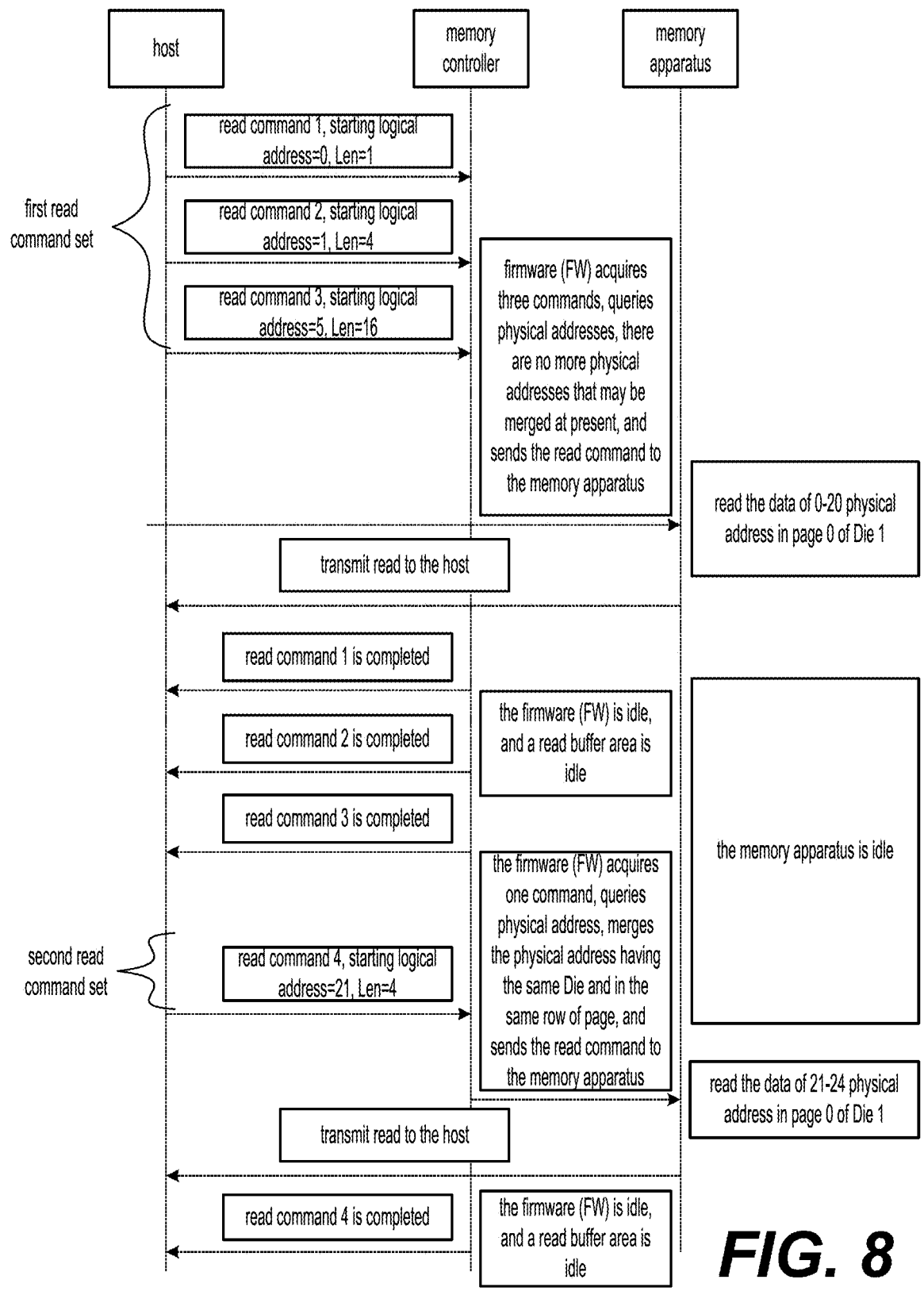
FIG. 8 is another schematic diagram illustrating a memory controller for controlling read according to a implementation of the present disclosure.

Only after executing the first read command set, the memory controller may execute a second read command set, even if the logical addresses of the read command 4 shown in FIG. 8 are also in page 0 of Die 1, it is also necessary to wait for the memory controller to execute the first read command set and then to execute the read command 4, such that the firmware and the read buffer area are occupied by the first command set with a small data size, thereby wasting the resources of the memory controller, and reducing the read performance.

In this regard, according to some aspects of the implementations of the present disclosure, provided are a memory controller and a control method thereof. The memory controller is coupled with at least one memory apparatus, and the memory apparatus includes a plurality of pages. Further, the memory controller can be configured to receive a first command set, wherein the first command set includes at least one read command, and, when the first command set meets a first preset condition, enable a first read mode, wherein the first preset condition includes that the queue depth of the first command set is 1 or the total length of logical addresses in the first command set is less than or equal to a first threshold value. Additionally, the memory controller can send demands corresponding to the first command set to the memory apparatus, and output data corresponding to the logical addresses in the first command set among all data of a first page sent by the memory apparatus, wherein the first page is a page, which corresponds to the logical addresses in the first command set, in the memory apparatus.

Figure 9:
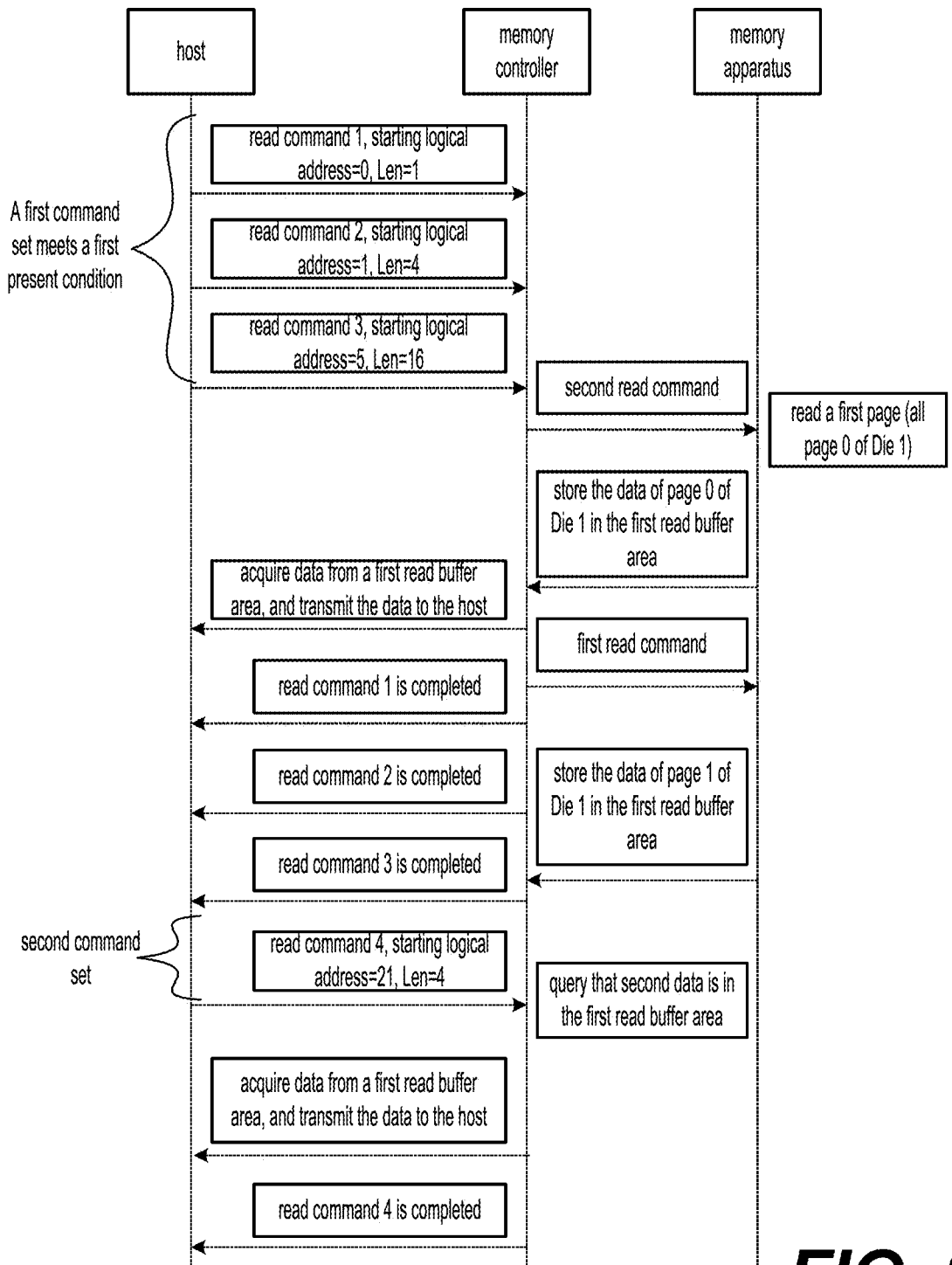
FIG. 9 is a schematic diagram illustrating a control method of a memory controller including a host and a memory apparatus according to an implementation of the present disclosure.

FIG. 9 is a schematic diagram of a control method of a memory controller including a host and a memory apparatus illustrated according to one aspect of the implementations of the present disclosure. Specifically, when the queue depth of the first command set is 1, that is, when the first command set only includes one read command, at this time, the first command set meets the first preset condition, the memory controller turns on the first read mode, and sends a second read command to the memory apparatus, so as to control the memory apparatus to read a page, which corresponds to the logical addresses in the first command set, in the memory apparatus, the page may be the first page, the first page may be pages on the same row of all planes in the memory apparatus, and one page may include one or more rows of memory cells.

The memory controller directly outputs, according to the logical addresses of the first command set, the data required by the host to the host, or stores all data of the first page in a buffer area (for example, the first read buffer area), then the memory controller accesses the buffer area, and outputs, according to the logical addresses of the first command set, the data required by the host to the host. The buffer area may be disposed in the memory controller, or may be disposed in the memory apparatus, or disposed outside the memory controller and the memory apparatus, and the buffer area may include a DRAM memory or an SRAM memory.

In some implementations, one memory apparatus may include one Die or a plurality of Dies, and the first page herein may be a corresponding page of a logical address corresponding to the at least one read command in the first command set or a merged logical address of a plurality of logical addresses in the memory apparatus. The first page appearing afterwards may include descriptions such as Die 1 page 0, which is only an example.

In some implementations, when the queue depth of the first command set is greater than 1, for example, as shown in FIG. 9, the queue depth of the first command set is 3, including the read command 1, the read command 2 and the read command 3; the logical address of the read command 1 is 0, the logical addresses of the read command 2 are 1 to 4, the logical addresses of the read command 3 are 5 to 20, the memory controller merges all logical addresses of the first command set, the merged logical addresses are 0 to 20, at this time, the logical address length is less than or equal to the first threshold value, the first threshold value may be a logical address length corresponding to a memory space occupied by one page in the memory apparatus, for example, the logical address length corresponding to 512 kb, and at this time, the first command set meets the first preset condition.

The memory controller sends the second read command to the memory apparatus, the memory apparatus reads all data of the first page, the first page may be page 0 of Die 0 in FIG. 9, and the first page includes data corresponding to the logical addresses in the first command set. The memory controller may directly output the data corresponding to the first command set to the host, or store all data of the first page in the first read buffer area, and the memory controller accesses the first read buffer area according to the logical addresses of the first command set, so as to acquire the data corresponding to the logical addresses of the first command set and to output the data to the host.

In some implementations, the logical address length of the first command set is relatively large and may cover two or more pages, and then the memory apparatus reads two or more pages in the first read mode.

In some implementations, when the first command set does not meet the first preset condition, ordinary read/write may be performed, or entire-page read may also be performed on the memory apparatus.

After receiving the first command set, the memory controller in the implementations of the present disclosure determines the first command set, and turns on the first read mode only when the first command set meets the first preset condition, such that the first read mode may be enabled for a case of a low queue depth or a relatively small logical address length included in the first preset condition, so as to fully utilize the parallel read capability of the memory apparatus and to improve the control performance of the memory controller in terms of read.

In some implementations, the memory controller includes a control portion and a read buffer area; and the read buffer area includes a first read buffer area, and the control portion is configured to, in the first read mode, store all data of the first page sent by the memory apparatus in the first read buffer area, and acquire, from the first read buffer area, the data corresponding to the logical addresses in the first command set, and output the data.

In the device architecture of the memory controller in the implementations of the present disclosure, the read buffer area may be a DRAM memory or an SRAM memory, which is integrated inside the memory controller, and the control portion may include a CMOS control circuit for a logic control operation. Compared with a solution in which no buffer area is provided, or the buffer area is disposed inside the memory apparatus or the buffer area is separately disposed outside the memory controller and the memory apparatus, the buffer area and the control portion in the implementations of the present disclosure have a shorter transmission distance and a greater transmission bandwidth.

The first read buffer area in the read buffer area may be a fixed memory space, and the spatial size of the first read buffer area may be greater than or equal to the spatial size of one page, for example, 512 kb. The first read buffer area may also be a randomly divided memory space, and may be a memory space that is divided by the memory controller in the first read mode according to the length of the logical addresses of the first command set in real time, so that the spatial size of the first read buffer area may be greater than or equal to the spatial size of one page, and when the first read mode is disabled, the memory controller may release the first read buffer area to store the data of other read modes. After the first read mode is enabled, the memory controller may allocate the space of one page of the idle read buffer area to the first read buffer area, so as to ensure that the first read buffer area has an enough space to store the data in the first read mode. The first read buffer area may also be configured to store information of the first command set received by the memory controller from the host, or store firmware or other information of the memory controller for executing the first read mode.

In the implementations of the present disclosure, all data of the first page in the first read mode are stored in the first read buffer area, and read buffer areas other than the first read buffer area may be used to store data in other read modes, for example, may be used to store data with a high queue depth and a large logical address length shown in FIG. 7. In the implementations of the present disclosure, the first read buffer area is configured to store the read data in the case of a low queue depth and a short logical address length shown in FIG. 8, thereby reducing the cases of the buffer area being idle and the memory apparatus being idle in FIG. 8, giving full play to the parallel read performance of the memory apparatus, improving the utilization rate of the space of the buffer area, shortening the data waiting time, and improving the read performance.

In some implementations, the control portion is configured to, when it is determined that an idle space in the read buffer area is greater than or equal to the space occupied by all data of one page, allocate the idle space in the read buffer area to the first read buffer area, send a first read command to the memory apparatus, and store all data of a second page sent by the memory apparatus in the first read buffer area, wherein the second page is the next page of the first page according to a programming sequence.

Figure 10:
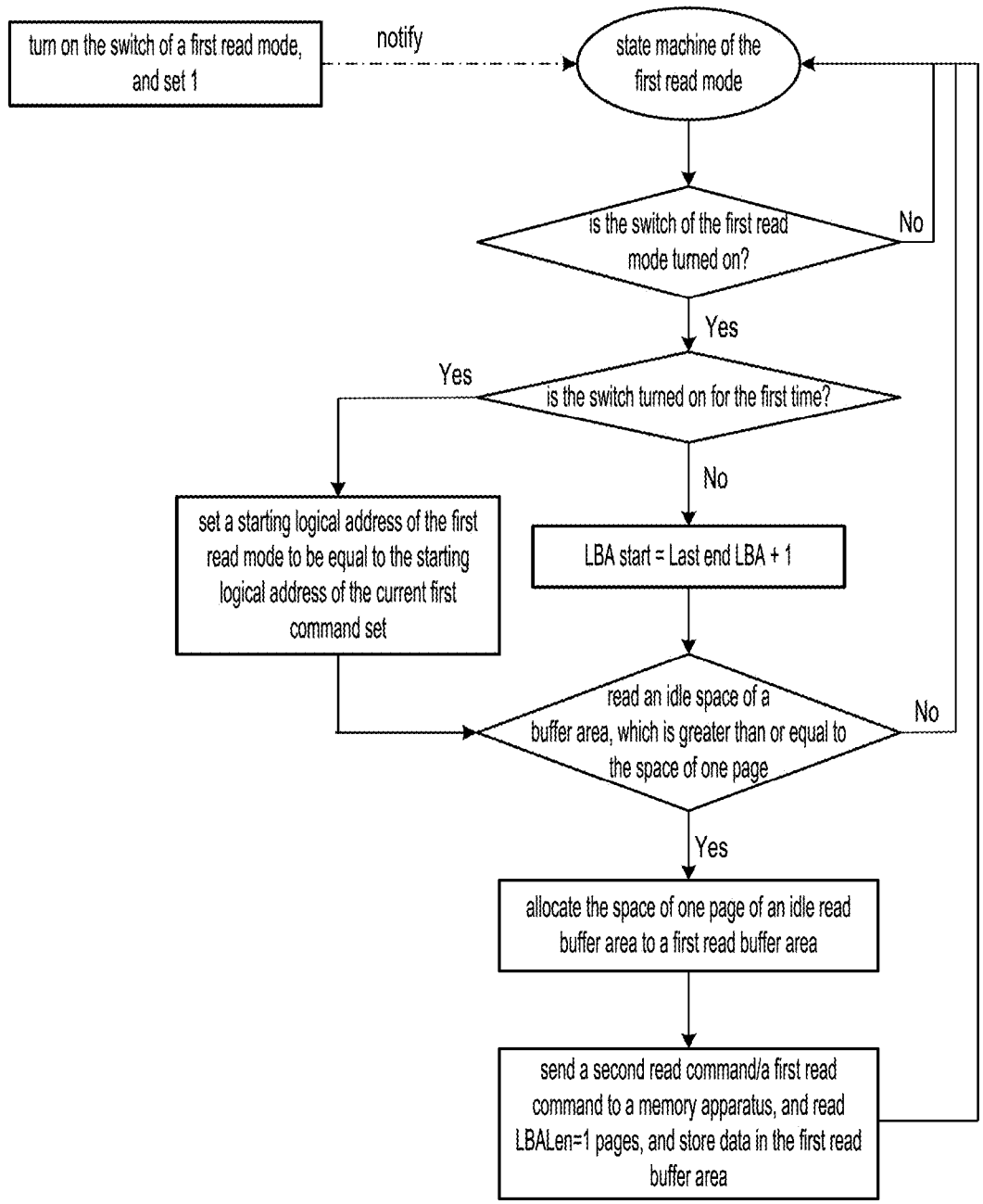
FIG. 10 is a schematic diagram illustrating a control flow of a memory controller in a first read mode according to an implementation of the present disclosure.

Referring to the schematic diagram of a control flow of the memory controller in the first read mode shown in FIG. 10, in some implementations, after determining that the first read mode is enabled, the memory controller also needs to determine whether the first read mode is enabled for the first time. Specifically, in combination with FIG. 9, if the first read mode is enabled for the first time, the starting logical address of the first read mode is the starting logical address 0 of the read command 1. If the first read mode is enabled for the second time, that is, a second command set is received after the first command set is completed, the queue depth of the second command set is 1, the first preset condition of the first read mode is also met, and at this time, the starting logical address of the first read mode is the starting logical address of the read command 4. The previous read command of the read command 4 is the read command 3, the logical addresses of the read command 3 are 5 to 20, the starting logical address of the read command 4 is an ending logical address plus 1 of the read command 3, that is, 20+1, 21. If there are more first read modes, the starting read address of the first read mode may be determined in conjunction with FIG. 9 and FIG. 10.

It can be understood that, the memory controller of the implementations of the present disclosure may accept a plurality of command sets, and one command set may correspond to one first read mode, and is not limited to the two command sets shown in FIG. 9. When there are more command sets, that is, the first command set, the second command set, the third command set until the Nth command set, if the total logical addresses after the logical addresses of all command sets are merged are continuous, and each command set meets the first preset condition, then the first command set is sequentially executed with reference to FIG. 10 until the first read mode of the Nth command set. If one of the command sets does not meet the first preset condition, then the first read mode is interrupted, and the operation of enabling the first read mode for the first time is started from one command set that meets the condition.

In the implementations of the present disclosure, no matter the first read mode is executed for which time, before executing the first read mode, the memory controller may first access the read buffer area, and allocate the idle space, which is greater than or equal to one page, of the read buffer area to the first read buffer area, so as to ensure that the first read buffer area has an enough space to store the data of one page.

In some implementations, before executing the first read mode, the memory controller may also access the first read buffer area, and if the idle space of the first read buffer area is less than the space of one page, allocate other idle spaces of the read buffer area to the first read buffer area, so as to ensure that the first read buffer area has an enough memory space, or the memory controller may clear the first read buffer area to release the idle space, so as to prepare for the next execution of the first read mode.

In some implementations, after receiving the second command set in FIG. 9, the memory controller sends the first read command to the memory apparatus, so as to control the memory apparatus to read the data of the second page of the memory apparatus in the first read mode, and before this operation, the memory controller has completed a read control operation for the data of the first page corresponding to the first command set. The first page may be page 0 of Die 0, the second page is page 1 of Die 1, the second page and the first page are continuously programmed during programming, and thus the updated logical addresses thereof are continuous.

It can be understood that, the read of the second page is continued herein, because at least part of the logical addresses of the second command set is in the second page, if the data corresponding to the logical addresses of the second command set is completely covered by the first page, then the memory controller does not need to send the first read command, and directly accesses the first read buffer area, so as to acquire data from the second command set and output the data to the host. In the present disclosure, the first read command is only for the purpose of being distinguished with the second read command. For example, in conjunction with shown in FIG. 10, when the first read mode is performed for the first time, the memory controller may send the second read command to the memory apparatus, and when the first read mode is performed for the second time, the memory controller may send the first read command to the memory apparatus.

In some implementations, the control portion is configured to receive a second command set, wherein the second command set includes at least one read command, and logical addresses in the second command set are continuous with the logical addresses in the first command set, and acquire, from the first read buffer area, data corresponding to the logical addresses in the second command set.

The implementations of the present disclosure are not limited to the first command set as shown in FIG. 9, and may further include a second command set, a third command set, or more command sets, and the logical addresses between the command sets are continuous.

In some implementations, the logical addresses of the second command set in FIG. 9 may also be all present in the page 0, and at this time, the memory controller may directly acquire the data corresponding to the second command set from the first read buffer area, and transmit the data to the host, without executing the first read mode again.

In some implementations, the control portion is configured to, before sending the demand corresponding to the first command set to the memory apparatus, when it is determined that the data corresponding to the logical addresses in the first command set is stored in the first read buffer area, acquire, from the first read buffer area, the data corresponding to the logical addresses in the first command set.

Figure 11:
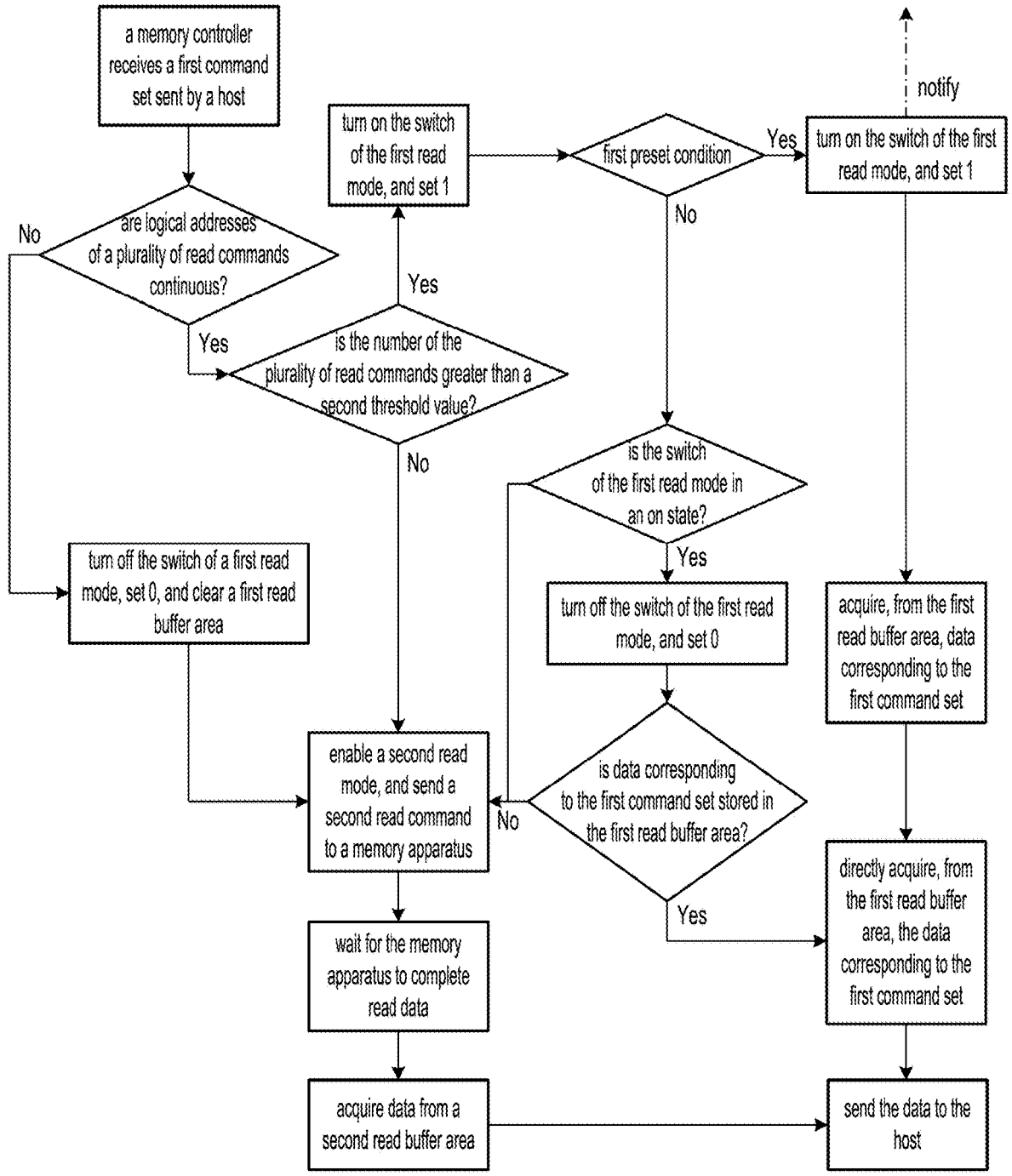
FIG. 11 is a schematic diagram illustrating a control flow of a memory controller before enabling a first read mode according to an implementation of the present disclosure.

FIG. 11 illustrates a schematic diagram of a control flow of the memory controller before enabling the first read mode according to an implementation of the present disclosure. Referring to FIG. 11, before turning on the switch of the first read mode, the memory controller may first access the first read buffer area, and determine whether the data corresponding to the first command set is stored in the first read buffer area, wherein the data may be stored when one or more pages are read during the previous execution of the first read mode. If so, the memory controller may directly acquire the data from the first read buffer area and output the same to the host, without repeated reading the data, thereby improving the read efficiency.

In some implementations, the first command set includes a plurality of read commands; and the memory controller is configured to, after the first command set meets a second preset condition, judge whether the first command set meets the first preset condition, wherein the second preset condition includes that the logical addresses of the plurality of read commands are continuous, and the number of the plurality of read commands is greater than a second threshold value.

In some implementations, with continued reference to FIG. 11, two determination cases in the first preset condition may be split, after receiving the first command set, the memory controller first determines whether the read commands in the first command set are continuous, and if not, the memory controller may turn off the switch of the first read mode. The logical addresses of the first command set being continuous requires that the logical addresses of each read command are continuous, and that the total logical addresses after merging are also continuous. After the determination is passed, the determination of the second threshold value is performed, the second threshold value may be a positive integer greater than 1, and the three read commands shown in FIG. 9 are merely examples.

In some implementations, referring to FIG. 11, when the first command set does not meet the second preset condition, when the switch of the first read mode is turned off, the first read buffer area may also be cleared, so as to provide a memory space for the subsequent execution of the first read mode.

In some implementations, determination nodes for determining whether the logical addresses of a plurality of read commands in FIG. 11 are continuous, and whether the number of the plurality of read commands is greater than the second threshold value may be adjusted, or the determination is simultaneously executed in one determination node, which is not limited in the implementations of the present disclosure.

In some implementations, the read buffer area further includes a second read buffer area; and the control portion is configured to, when the first command set does not meet the first preset condition or the first command set does not meet the second preset condition, disable the first read mode and enable a second read mode, and store, in the second read buffer area, the data corresponding to the logical addresses in the first command set sent by the memory apparatus.

In some implementations, when the first command set does not meet any one of the first preset condition and the second preset condition, or the both, the memory controller may confirm whether the first read mode is disabled, and may enable the second read mode after confirming that the first read mode is disabled, in the second read mode, the entire page of the memory apparatus may not be read, and the data read by the memory apparatus in the second read mode may be stored in the second read buffer area. The second read buffer area may be a fixed memory space, or may be divided and released by the memory controller according to the real-time logical address length of the first command set, and the memory controller may also allocate all remaining idle spaces to be the second read buffer area after allocating the first read buffer area.

In some implementations, referring to FIG. 11, when the first command set includes a plurality of read commands, the determination node of the second preset condition may be placed in front of the first preset condition, after the determination of the second preset condition is passed, the determination of the first preset condition is performed, and the first read mode is executed after all determinations are passed.

In some implementations, the control portion is configured to, when the first command set does not meet the second preset condition and the first read mode is enabled, disable the first read mode, and, when it is determined that the data corresponding to the logical addresses in the first command set is stored in the first read buffer area, acquire, from the first read buffer area, the data corresponding to the logical addresses in the first command set.

In some specific examples, after the first read mode is performed for one or more times, the memory controller stores the data of one or more pages sent by the memory apparatus in the first read buffer area, the first read buffer area stores a data size that is greater than or equal to the data required by the host, and the data required by the host at present may have been stored in the first read buffer area and is not cleared by the memory controller. At this time, when executing the current first read mode, the second read mode or other read modes, the memory controller may first access the first read buffer area, and determine whether the data required by the host at present has been stored in the first read buffer area, if so, there is no need for the memory controller to read the data again, so the memory controller directly outputs the data required by the host from the first read buffer area to the host, thereby improving the read performance.

For example, referring to FIG. 11, when the first command set does not meet the second preset condition, when enabling the second read mode or other read modes, the memory controller may first access the first read buffer area, confirm, according to the logical addresses of the first command set, whether the data required by the host at present is stored in the first read buffer area, if so, transmit the data corresponding to the logical addresses to the host, and no longer execute the second read mode, thereby shortening the read time, and improving the read performance.

In the implementations of the present disclosure, by means of setting the first read mode, the idle read buffer area may be allocated to the first read buffer area, the read logic length of each first read mode is set to be one page, and the data is stored in the first read buffer area, until the first read buffer area is not idle. When a host command is sent to the memory controller, the current mode is checked, if the current mode is sequential read and the first read mode is enabled, the data may be directly read from the first read buffer area and returned to the host. In this way, the number of read times of the memory apparatus is reduced, thereby shortening the total read time and improving the performance.

It should be noted that, the implementations of the present disclosure may not only be applicable to the read case of the low queue depth and the short logical address in FIG. 9, but may also be applicable to the read case of the high queue depth and the long logical address in FIG. 7 or random read or other read cases. After the memory controller in the implementations of the present disclosure receives the command set sent by the host, the memory controller may determine whether the command set meets the first preset condition, the second preset condition or other preset conditions with reference to FIG. 11, and select to enable the first read mode, the second read mode or other read modes according to the determination result, which is suitable for various read cases, thereby improving the read performance.

In some implementations, the first threshold value/the second threshold value is obtained by means of data training.

In the implementations of the present disclosure, by means of building a memory system of the host, the memory controller and the memory apparatus, operation firmware in the memory controller is improved for the first read mode and the second read mode, read commands of a plurality of queue depths and a plurality of logical address lengths are issued to the memory controller by the host, the read rate of the memory system under each read command is monitored in cooperation with read rate detection software of the host, and the read rate is a rate in an entire process when the host sends a read command to the memory controller, and the host receives the final data. Tests of different values are performed on the first threshold value and the second threshold value, data training is performed on the memory controller by means of a large number of different read commands, and the read rate is used as an evaluation index, so as to acquire an optimal first threshold value and an optimal second threshold value. For example, the first threshold value may be a logical address length corresponding to a memory space occupied by one page in the memory apparatus, for example, may be a logical address length corresponding to 512 kb.

Figure 12:
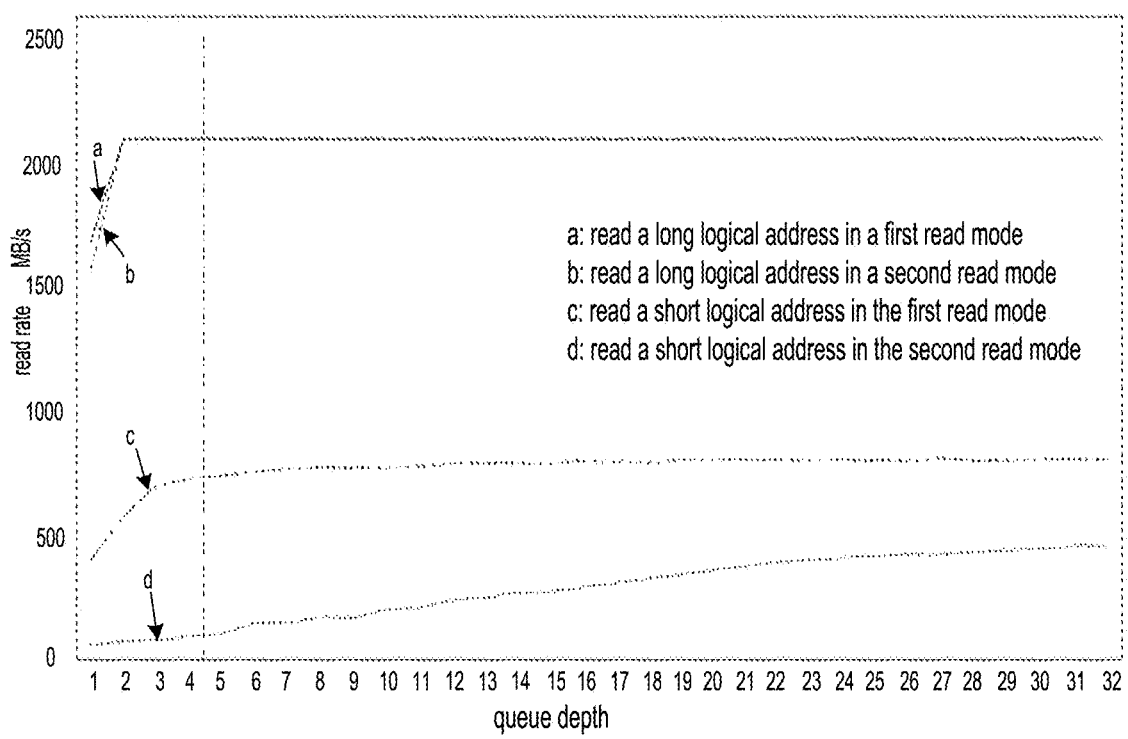
FIG. 12 is an example diagram illustrating read rate curves of different read modes at different queue depths according to an implementation of the present disclosure.

Referring to FIG. 12, under the UFS protocol, the memory controller is tested at read commands of different logical address lengths at different queue depths. Curve a is a read rate curve when a long logical address is read in the first read mode, curve b is a read rate curve when the long logical address is read in the second read mode, curve c is a read rate curve when a short logical address is read in the first read mode, and curve d is a read rate curve when the short logical address is read in the second read mode. The long logical address may be a logical address greater than the length corresponding to one page of the memory apparatus, and the short logical address may be a logical address smaller than the length corresponding to one page of the memory apparatus.

It can be seen from comparison of curves c and d that, when the logical address is shorter, the overall read rate of the first read mode is significantly improved than the second read mode, especially in an interval of queue depths 1 to 5. A rising trend of the curve c between the queue depths 3 to 5 tends to be gentle, the second threshold value may be between 3 and 5, and at this time, the number of a plurality of read commands (i.e., the queue depth) in the first command set is greater than the second threshold value, such that the first read mode reaches the maximum read rate in the curve c.

It can be seen from comparison of curves a and b that, when the logical address is longer, the difference in the read rate of the entire-page read in the first read mode and the read rate of the high queue length of the ordinary second read mode is not large, and the influence of the second threshold value on the two read modes is not large.

When the queue depth is 1, during the read of the long logical address, the read rate of the first read mode is slightly greater than the read rate of the second read mode; and during the read of the short logical address, the read rate of the second read mode is obviously reduced, therefore, when the queue depth of the first command set is 1, the first read mode is enabled, and a higher read rate may be obtained regardless of the long logical address or the short logical address, such that the read performance is improved.

FIG. 3 illustrates a schematic circuit diagram of a memory apparatus 300 including a peripheral circuit in some aspects of the implementations of the present disclosure. Referring to FIG. 3, the memory apparatus 300 includes a memory array 301 and a peripheral circuit 302, wherein, the memory array 301 includes a plurality of pages 320. The peripheral circuit 302 can be configured to receive a second read command in a first read mode, and perform a read operation on all data of a first page, wherein the first page is a page, which corresponds to logical addresses in a first command set, in the memory apparatus.

The page 320 may be a page on the same row of all planes in the memory apparatus, and one page 320 may include one or more rows of memory cells 306.

In some implementations, referring to FIG. 9, the second read command may be sent by the memory controller to the memory apparatus, and after receiving the second read command, the memory apparatus reads, in the first read mode, all data of the first page according to physical addresses corresponding to the logical addresses of the first command set.

In some implementations, the peripheral circuit is configured to receive a first read command, and perform a read operation on all data of a second page, wherein the second page is the next page of the first page according to a programming sequence.

In some implementations, the peripheral circuit is configured to receive the second read command in a second read mode, and perform a read operation on a physical address corresponding to the logical address in the second read command.

With reference to FIG. 9, the first read command and the second read command are issued by the memory controller, and include a physical address that the memory controller requires the memory apparatus to read, and the first read mode or the second read mode may be controlled in real time by the memory controller.

In some implementations, the memory apparatus includes a NAND memory. The NAND memory of the implementations of the present disclosure may include the memory array 301 shown in a buffer.

Some aspects of the implementations of the present disclosure provide a memory system, and referring to FIG. 1, a memory system 102 includes a memory controller 106 and at least one memory device 104 coupled with the memory controller 106 that is coupled with a host 108. The memory controller 106 can be configured to receive a first command set sent by the host 108, wherein the first command set includes at least one read command, when the first command set meets a first preset condition, enable a first read mode, wherein the first preset condition includes that the queue depth of the first command set is 1 or the total length of logical addresses in the first command set is less than or equal to a first threshold value, and merge demands corresponding to the first command set into a second read command, and send the second read command to the memory apparatus. The memory device 104 includes a memory array and a peripheral circuit. The memory array includes a plurality of pages. The peripheral circuit is configured to receive the second read command in the first read mode, and perform a read operation on a first page, and send all data of the first page to the memory controller 106, wherein the first page is a page, which corresponds to the logical addresses in the first command set, in the memory device 104. Additionally, the memory controller 106 is further configured to transmit, to the host 108, data corresponding to the logical addresses in the first command set among all data of the first page sent by the memory device 104.

The first command set of the implementations of the present disclosure may correspond to a plurality of read commands, the memory controller merges the logical addresses of the plurality of read commands, queries the physical address according to the merged total logical address, writes the physical address of the entire page to be read into the second read command and sends the second read command to the memory apparatus, and the memory apparatus reads the data on a corresponding physical location after receiving the second read command, and then sends the data to the memory controller.

In some implementations, the memory controller includes a control portion and a read buffer area; and the read buffer area includes a first read buffer area, and the control portion is configured to, in the first read mode, store all data of the first page sent by the memory apparatus in the first read buffer area.

In some implementations, the control portion is configured to, when it is determined that an idle space in a read buffer area is greater than or equal to the space occupied by all data of one page, allocate the idle space in the read buffer area to the first read buffer area; and send the first read command to the memory apparatus.

The peripheral circuit is configured to receive the first read command; perform a read operation on a second page, and send all data of the second page to the memory controller, wherein the second page is the next page of the first page according to a programming sequence.

The control portion is further configured to store all data of the second page sent by the memory apparatus in the first read buffer area.

In some implementations, the control portion is configured to receive a second command set sent by the host, wherein the second command set includes at least one read command, and logical addresses in the second command set are continuous with logical addresses in the first command set, and acquire, from the first read buffer area, data corresponding to the logical addresses in the second command set, and transmit the acquired data to the host.

In some implementations, the control portion is configured to, before merging the demands corresponding to the first command set into the second read command and sending the second read command to the memory apparatus, when it is determined that the data corresponding to the logical addresses in the first command set is stored in the first read buffer area, acquire, from the first read buffer area, the data corresponding to the logical addresses in the first command set, and transmit the acquired data to the host.

In some implementations, the peripheral circuit is configured to receive the second read command in a second read mode, perform a read operation on physical addresses corresponding to the logical addresses in the first command set, and send, to the memory controller, data corresponding to the logical address in the second read command.

The read buffer area further includes a second read buffer area, the control portion is configured to, when the first command set does not meet the first preset condition or the first command set does not meet a second preset condition, disable the first read mode and enable the second read mode; store, in the second read buffer area, data corresponding to the logical addresses in the first command set sent by the memory apparatus; and transmit the data stored in the second read buffer area to the host, wherein the second preset condition includes that the logical addresses of the plurality of read commands included in the first command set are continuous, and the number of the plurality of read commands is greater than a second threshold value.

In some implementations, the control portion is configured to, when the first command set does not meet the second preset condition and the first read mode is enabled, disable the first read mode, and, when it is determined that the data corresponding to the logical addresses in the first command set is stored in the first read buffer area, acquire, from the first read buffer area, the data corresponding to the logical addresses in the first command set, and transmit the acquired data to the host.

In some implementations, the memory system includes a universal flash memory (UFS) device. The flash memory (UFS) is a communication protocol between the host and the memory system, the implementations of the present disclosure are not limited thereto, and may further include other communication protocols.

Some aspects of the implementations of the present disclosure provide a control method of a memory controller, and the control method includes receiving a first command set, wherein the first command set includes at least one read command, when the first command set meets a first preset condition, enabling a first read mode, wherein the first preset condition includes that the queue depth of the first command set is 1 or the total length of logical addresses in the first command set is less than or equal to a first threshold value, sending demands corresponding to the first command set to a memory apparatus, and outputting data corresponding to the logical addresses in the first command set among all data of a first page sent by the memory apparatus, wherein the first page is a page, which corresponds to the logical addresses in the first command set, in the memory apparatus.

In some implementations, the control method further includes, in the first read mode, storing all data of the first page sent by the memory apparatus in the first read buffer area of the controller, and acquiring, from the first read buffer area, the data corresponding to the logical addresses in the first command set, and outputting the data.

In some implementations, the control method further includes, when it is determined that an idle space in a read buffer area of the memory controller is greater than or equal to the space occupied by all data of one page, allocating the idle space in the read buffer area to the first read buffer area, sending a first read command to the memory apparatus, and storing all data of a second page sent by the memory apparatus in the first read buffer area, wherein the second page is the next page of the first page according to a programming sequence.

In some implementations, the control method further includes receiving a second command set, wherein the second command set includes at least one read command, and logical addresses in the second command set are continuous with logical addresses in the first command set, and acquiring, from the first read buffer area, data corresponding to the logical addresses in the second command set.

In some implementations, the control method further includes, before sending the demand corresponding to the first command set to the memory apparatus, when it is determined that the data corresponding to the logical addresses in the first command set is stored in the first read buffer area, acquiring, from the first read buffer area, the data corresponding to the logical addresses in the first command set.

In some implementations, the first command set includes a plurality of read commands; and the control method further includes, after the first command set meets a second preset condition, judging whether the first command set meets the first preset condition, wherein the second preset condition includes that the logical addresses of the plurality of read commands are continuous, and the number of the plurality of read commands is greater than a second threshold value.

In some implementations, the control method further includes, when the first command set does not meet the first preset condition or the first command set does not meet the second preset condition, disabling the first read mode and enabling the second read mode, and storing, in a second read buffer area in the read buffer area, the data corresponding to the logical addresses in the first command set sent by the memory apparatus.

In some implementations, the control method further includes, when the first command set does not meet the second preset condition and the first read mode is enabled, disabling the first read mode, and, when it is determined that the data corresponding to the logical addresses in the first command set is stored in the first read buffer area, acquiring, from the first read buffer area, the data corresponding to the logical addresses in the first command set.

Some aspects of the implementations of the present disclosure provide a control method of a memory apparatus, and the control method includes receiving a second read command in a first read mode, and performing a read operation on a first page in the memory apparatus, wherein the first page is a page, which corresponds to logical addresses in a first command set, in the memory apparatus.

In some implementations, the control method further includes receiving a first read command, and performing a read operation on all data of a second page, wherein the second page is the next page of the first page according to a programming sequence.

In some implementations, the control method further includes receiving the second read command in a second read mode, and performing a read operation on a physical address corresponding to the logical address in the second read command.

Some aspects of the implementations of the present disclosure provide an operation method of a memory system, characterized by including receiving, by a memory controller, a first command set sent by a host, wherein the first command set includes at least one read command; when the first command set meets a first preset condition, enabling a first read mode, wherein the first preset condition includes that the queue depth of the first command set is 1 or the total length of logical addresses in the first command set is less than or equal to a first threshold value; merging demands corresponding to the first command set into a second read command, and sending the second read command to a memory apparatus, receiving, by the memory apparatus, the second read command in the first read mode; and performing a read operation on a first page, and sending all data of the first page to the memory controller, wherein the first page is a page, which corresponds to the logical addresses in the first command set, in the memory apparatus, and transmitting, by the memory controller and to the host, data corresponding to the logical addresses in the first command set among all data of the first page sent by the memory apparatus.

In some implementations, the control method further includes, in the first read mode, storing, by the memory controller, all data of the first page sent by the memory apparatus in a first read buffer area of the memory controller.

In some implementations, the control method further includes, after transmitting the acquired data to the host, when it is determined that an idle space in a read buffer area is greater than or equal to the space occupied by all data of one page, allocating, by the memory controller, the idle space in the read buffer area to the first read buffer area; and sending a first read command to the memory apparatus, receiving, by the memory apparatus, the first read command; performing a read operation on a second page, and sending all data of the second page to the memory controller, wherein the second page is the next page of the first page according to a programming sequence; and storing, by the memory controller, all data of the second page sent by the memory apparatus in the first read buffer area.

In some implementations, the control method further includes receiving, by the memory controller, a second command set sent by the host, wherein the second command set includes at least one read command, and logical addresses in the second command set are continuous with logical addresses in the first command set, and acquiring, from the first read buffer area, data corresponding to the logical addresses in the second command set, and transmitting the acquired data to the host.

In some implementations, the control method further includes, before the memory controller merges the demands corresponding to the first command set into the second read command and sends the second read command to the memory apparatus, when the memory controller determines that the data corresponding to the logical addresses in the first command set is stored in the first read buffer area, acquiring, from the first read buffer area, the data corresponding to the logical addresses in the first command set, and transmitting the acquired data to the host.

In some implementations, the control method further includes receiving, by the memory apparatus, the second read command in a second read mode; performing a read operation on physical addresses corresponding to the logical addresses in the first command set, and sending, to the memory controller, data corresponding to the logical address in the second read command, and when the first command set does not meet the first preset condition or the first command set does not meet a second preset condition, disabling, by the memory controller, the first read mode and enabling the second read mode; storing, in a second read buffer area of the read buffer area, the data corresponding to the logical addresses in the first command set sent by the memory apparatus; and transmitting the data stored in the second read buffer area to the host, wherein the second preset condition includes that the logical addresses of the plurality of read commands included in the first command set are continuous, and the number of the plurality of read commands is greater than a second threshold value.

In some implementations, the method further includes, when the first command set does not meet the second preset condition and the first read mode is enabled, disabling, by the memory controller, the first read mode, and when the memory controller determines that the data corresponding to the logical addresses in the first command set is stored in the first read buffer area, acquiring, from the first read buffer area, the data corresponding to the logical addresses in the first command set, and transmitting the acquired data to the host.

The foregoing descriptions are merely specific implementations of the present disclosure, but the protection scope of the present disclosure is not limited thereto, and modifications or substitutions, should be covered within the protection scope of the present disclosure. Therefore, the protection scope of the present disclosure shall be subject to the protection scope of the claims.

The invention claimed is:

1. A memory controller that is coupled with at least one memory apparatus having a plurality of pages, the memory controller being configured to:
receive a first command set having at least one read command;
enable a first read mode when the first command set meets a first preset condition, the first preset condition including that a number of read commands included in the first command set is 1 or a total length of logical addresses in the first command set is less than or equal to a first threshold value;
send demands corresponding to the first command set to the memory apparatus; and
output data corresponding to the logical addresses in the first command set among all data of a first page sent by the memory apparatus, the first page being a page, which corresponds to the logical addresses in the first command set, in the memory apparatus,
wherein the first command set comprises a plurality of read commands, and the memory controller further comprises a read buffer area that includes a first read buffer area and a control portion that is configured to:
in the first read mode, store all data of the first page sent by the memory apparatus in the first read buffer area,
acquire, from the first read buffer area, the data corresponding to the logical addresses in the first command set, and output the data, and
after the first command set meets a second preset condition, judge whether the first command set meets the first preset condition, the second preset condition including that the logical addresses of the plurality of read commands are continuous, and the number of the plurality of read commands is greater than a second threshold value.

2. The memory controller of claim 1, wherein the control portion is configured to:
when determining that an idle space in the read buffer area is greater than or equal to the space occupied by all data of one page, allocate the idle space in the read buffer area to the first read buffer area;
send a first read command to the memory apparatus; and
store all data of a second page sent by the memory apparatus in the first read buffer area, the second page being a next page of the first page according to a programming sequence.

3. The memory controller of claim 1, wherein the control portion is configured to:
receive a second command set having at least one read command, logical addresses in the second command set being continuous with the logical addresses in the first command set; and
acquire, from the first read buffer area, data corresponding to the logical addresses in the second command set.

4. The memory controller of claim 1, wherein the control portion is configured to:
before sending the demand corresponding to the first command set to the memory apparatus, when determining that the data corresponding to the logical addresses in the first command set is stored in the first read buffer area, acquire, from the first read buffer area, the data corresponding to the logical addresses in the first command set.

5. The memory controller of claim 1, wherein the read buffer area further comprises a second read buffer area and the control portion being configured to:
when the first command set does not meet the first preset condition or the first command set does not meet the second preset condition, disable the first read mode and enable a second read mode; and
store, in the second read buffer area, the data corresponding to the logical addresses in the first command set sent by the memory apparatus.

6. The memory controller of claim 5, wherein the control portion is configured to:
when the first command set does not meet the second preset condition and the first read mode is enabled, disable the first read mode; and
when determining that the data corresponding to the logical addresses in the first command set is stored in the first read buffer area, acquire, from the first read buffer area, the data corresponding to the logical addresses in the first command set.

7. The memory controller of claim 1, wherein the first threshold value/the second threshold value is obtained by means of data training.

8. The memory controller of claim 1, wherein the memory apparatus comprises a NAND memory.

9. A memory system having a memory controller and at least one memory apparatus coupled with the memory controller, wherein, the memory controller is coupled with a host and configured to: receive a first command set sent by the host, the first command set comprising at least one read command; when the first command set meets a first preset condition, enable a first read mode, the first preset condition comprising that a number of read commands included in the first command set is 1 or a total length of logical addresses in the first command set is less than or equal to a first threshold value; and merge demands corresponding to the first command set into a second read command, and send the second read command to the memory apparatus;

the memory apparatus includes a memory array and a peripheral circuit; the memory array including a plurality of pages; the peripheral circuit is configured to: receive the second read command in the first read mode; and perform a read operation on a first page, and send all data of the first page to the memory controller, the first page being a page, which corresponds to the logical addresses in the first command set, in the memory apparatus; and the memory controller is further configured to: transmit, to the host, data corresponding to the logical addresses in the first command set among all data of the first page sent by the memory apparatus, wherein the memory controller includes a read buffer area that includes a first read buffer area and a control portion that is configured to, in the first read mode, store all data of the first page sent by the memory apparatus in the first read buffer area, the peripheral circuit is configured to receive the second read command in a second read mode, perform a read operation on physical addresses corresponding to the logical addresses in the first command set, and send, to the memory controller, data corresponding to the logical address in the second read command, and the read buffer area further includes a second read buffer area, the control portion is configured to: when the first command set does not meet the first preset condition or the first command set does not meet a second preset condition, disable the first read mode and enable the second read mode; store, in the second read buffer area, data corresponding to the logical addresses in the first command set sent by the memory apparatus; and transmit the data stored in the second read buffer area to the host, the second preset condition comprising that the logical addresses of the plurality of read commands comprised in the first command set are continuous, and the number of the plurality of read commands is greater than a second threshold value.

10. The memory system of claim 9, wherein:

the control portion is configured to, when determining that an idle space in the read buffer area is greater than or equal to the space occupied by all data of one page, allocate the idle space in the read buffer area to the first read buffer area, and send a first read command to the memory apparatus;

the peripheral circuit is configured to receive the first read command, perform a read operation on a second page, and send all data of the second page to the memory controller, the second page being a next page of the first page according to a programming sequence; and the control portion is further configured to store all data of the second page sent by the memory apparatus in the first read buffer area.

11. The memory system of claim 9, wherein the control portion is configured to:

receive a second command set sent by the host, the second command set including at least one read command, and logical addresses in the second command set being continuous with logical addresses in the first command set; and acquire, from the first read buffer area, data corresponding to the logical addresses in the second command set, and transmit the acquired data to the host.

12. The memory system of claim 9, wherein the control portion is configured to:

before merging the demands corresponding to the first command set into the second read command and sending the second read command to the memory apparatus, when determining that the data corresponding to the logical addresses in the first command set is stored in the first read buffer area, acquire, from the first read buffer area, the data corresponding to the logical addresses in the first command set, and transmit the acquired data to the host.

13. The memory system of claim 9, wherein the control portion is configured to:

when the first command set does not meet the second preset condition and the first read mode is enabled, disable the first read mode; and when determining that the data corresponding to the logical addresses in the first command set is stored in the first read buffer area, acquire, from the first read buffer area, the data corresponding to the logical addresses in the first command set, and transmit the acquired data to the host.

14. The memory system of claim 9, wherein the peripheral circuit is configured to:

receive a first read command; and perform a read operation on all data of a second page, the second page being a next page of the first page according to a programming sequence.

15. The memory system of claim 9, wherein the peripheral circuit is configured to:

receive the second read command in a second read mode; and perform a read operation on a physical address corresponding to the logical address in the second read command.

16. The memory system of claim 9, wherein the memory apparatus comprises a NAND memory.

17. The memory system of claim 9, wherein the first threshold value/the second threshold value is obtained by means of data training.

18. The memory system of claim 9, wherein the first command set comprises a plurality of read commands, and the memory controller is further configured to:

after the first command set meets a second preset condition, judge whether the first command set meets the first preset condition, the second preset condition including that the logical addresses of the plurality of read commands are continuous, and the number of the plurality of read commands is greater than a second threshold value.

* * * * *